(12) United States Patent
Chapman

(10) Patent No.: US 11,572,957 B2
(45) Date of Patent: Feb. 7, 2023

(54) ROTARY DISC VALVE

(71) Applicant: Robert Bosch GmbH, Stuttgart (DE)

(72) Inventor: Thomas Chapman, Templeton, MA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/341,993

(22) Filed: Jun. 8, 2021

(65) Prior Publication Data
US 2022/0390025 A1     Dec. 8, 2022

(51) Int. Cl.
*F16K 11/08*     (2006.01)
*F16K 27/06*     (2006.01)

(52) U.S. Cl.
CPC .............. *F16K 11/08* (2013.01); *F16K 27/06* (2013.01); *Y10T 137/86863* (2015.04)

(58) Field of Classification Search
CPC .......... F16K 11/085–0856; F16K 1/44; F16K 1/443; F16K 5/181; F16K 5/184; F16K 39/045; F16K 25/00–04; F16K 11/0743; F16K 11/0746; F16K 11/0853; Y10T 137/86863; Y10T 137/86871; F16J 15/00–56; F16J 15/34; F16J 15/44; F16J 15/447; F16J 15/4472
USPC ....... 137/602–887; 210/348–510.1; 277/361, 277/362, 402
See application file for complete search history.

(56) References Cited

U.S. PATENT DOCUMENTS

| | | | | |
|---|---|---|---|---|
| 2,051,155 A | * | 8/1936 | Staegemann | C02F 1/42 137/625.46 |
| 3,385,321 A | * | 5/1968 | Ehrens | F16K 11/0743 251/188 |
| 3,640,310 A | * | 2/1972 | Erlich | F16K 11/074 210/411 |
| 3,756,275 A | * | 9/1973 | Barrera | F16K 11/0743 137/590 |
| 3,863,675 A | * | 2/1975 | Wiltshire | F16K 11/074 137/625.46 |
| 3,911,956 A | * | 10/1975 | LeBreton | F16K 11/0743 210/411 |
| 4,216,798 A | * | 8/1980 | Tscherner | F16K 11/0743 137/625.46 |
| 4,674,538 A | * | 6/1987 | Yes | F16K 11/0743 137/625.46 |
| 4,869,817 A | * | 9/1989 | Mendoza | B01D 24/14 210/429 |
| 4,895,655 A | * | 1/1990 | Schindler | B01D 29/94 210/411 |

(Continued)

*Primary Examiner* — Craig J Price
(74) *Attorney, Agent, or Firm* — Kelly McGlashen; Maginot, Moore & Beck LLP

(57) ABSTRACT

A rotary disc valve is used in a fluid delivery system to control flow of fluid between multiple ports. The valve may include a valve body having multiple ports that are connected to the system. In addition, the valve may include a diverter and seal assembly that are disposed in the valve body. The diverter is configured to rotate about a rotational axis and to control fluid flow through the valve body in such a way that fluid enters the diverter in a first direction that is parallel to the rotational axis, fluid exits the diverter in a second direction that is parallel to the rotational axis, the second direction being opposite the first direction, and between entering and exiting, fluid flows over a portion of the diverter outer surface.

18 Claims, 22 Drawing Sheets

(56) References Cited

U.S. PATENT DOCUMENTS

| | | | |
|---|---|---|---|
| 5,741,005 A * | 4/1998 | Vaughan | C02F 1/42 |
| | | | 251/208 |
| 6,085,788 A | 7/2000 | Larson et al. | |
| 6,186,174 B1 * | 2/2001 | Yurchision | F16K 3/10 |
| | | | 137/625.46 |
| 7,255,130 B2 | 8/2007 | Martins et al. | |
| 7,343,882 B2 * | 3/2008 | Pipkorn | F01P 7/167 |
| | | | 123/41.1 |
| 9,410,628 B2 | 8/2016 | Bachofer | |
| 9,638,340 B2 | 5/2017 | Bachofer | |
| 9,803,759 B2 | 10/2017 | Bachofer | |
| 9,803,760 B2 | 10/2017 | Morein | |
| 9,874,284 B2 | 1/2018 | Bachofer | |
| 10,344,877 B2 | 7/2019 | Roche et al. | |
| 10,563,780 B2 * | 2/2020 | Leroyer | F16K 11/076 |
| 10,619,899 B2 * | 4/2020 | Willers | F16K 11/0853 |
| 10,914,390 B2 * | 2/2021 | Chapman | F16K 11/0853 |
| 11,002,375 B2 * | 5/2021 | Marchand | F16K 11/085 |
| 2006/0011244 A1 * | 1/2006 | Ibanez | F16K 11/074 |
| | | | 137/625.11 |
| 2010/0059425 A1 * | 3/2010 | Roig | C02F 1/006 |
| | | | 210/105 |
| 2015/0233483 A1 | 8/2015 | Bachofer | |
| 2017/0165602 A1 * | 6/2017 | Postage | B65D 81/26 |
| 2019/0136988 A1 * | 5/2019 | Mizuno | B60S 1/481 |

* cited by examiner

ROTARY DISC VALVE

BACKGROUND

A rotary valve is a type of directional control valve that may be used in a fluid delivery system to control fluid flow and distribution through the system. For example, rotary valves may be used to control the flow of coolant through a vehicle cooling system. The rotary valve may include a valve body that defines several ports and a diverter that is disposed in the valve body. The diverter is shaped to distribute the flow to predetermined ports for certain rotational orientations of the diverter within the valve body, and is rotated relative to the valve body to control flow through the valve.

In some conventional rotary valves, the diverter moves against an elastomeric sealing element. However, elastomers have higher friction factors than some other conventional materials, which may result in higher required torque to rotate the valve. Other conventional rotary valves employ low friction plastic materials. In such valves, the diverter may be cylindrical in shape. Cylindrical diverters, often referred to as "plugs", may result in higher operating torque and less flexibility in placement and orientation of the inlet and outlet tubes. Still other rotary valves use a disc-shaped diverter. Such rotary disc valves may use ceramic materials for the sealing components. However, using a ceramic disc as a diverter limits the options regarding the shape of the diverter, and can be more expensive relative to diverters formed of other materials such as plastic.

SUMMARY

Complex fluid delivery systems may require a rotary disc valve that is capable of controlling fluid flow between three, four, five or more individual ports of the valve body. For example, a multi-port rotary disc valve may be used in a cooling system of an electric vehicle to control flow of coolant fluid between a radiator, an electric drive motor, a battery, vehicle electronics, and one or more bypass lines. The rotary disc valve may include a valve body that has ports that are irregularly spaced along a circumference of the valve body. In addition, the rotary disc valve may include a disc-type diverter that is disposed in the valve body and is rotatable relative to the valve body about a rotational axis that is typically perpendicular to the plane in which the ports reside. The diverter is generally disc shaped, and includes an outer surface from which a shaft protrudes. The diverter outer surface is opposite a diverter seal surface via which the diverter forms a seal with the valve body. The diverter has a three-dimensional shape that allows the working fluid to pass on either side of it. More particularly, the diverter is configured to control fluid flow through the valve body in such a way that fluid enters the diverter from the seal surface side and in a first direction that is parallel to the shaft rotational axis. Fluid exits the diverter in a second direction that is parallel to the rotational axis, the second direction being opposite the first direction. Between entering and exiting the diverter, fluid flows over a portion of the diverter outer surface.

The shape of the diverter is such that the diverter provides one fluid flow path via a closed passageway that protrudes from the diverter outer surface, and provides another fluid flow path that permits fluid flow through openings in the diverter and is constrained only by the valve body.

The diverter seal surface may be planar (e.g., flat or level and smooth, without raised areas, protrusions, recesses, indentations or surface features or irregularities) and may interface with a facing flat surface of a stationary, thin seal plate. The seal plate may be constructed from a plastic that has low friction and highly wear resistive properties. The seal plate is thin to provide flexibility that allows the wear plate to conform to any irregularities in the flat seal surface of the diverter. The seal plate is backed by a stationary elastic element. The elastic element provides elasticity, biases the seal plate toward the diverter seal surface, and allows the thin seal to conform to the flat seal surface of the diverter. The elastic element also provides a static seal between the seal plate and the valve housing. As used herein, the term "static seal" refers to a seal in which the elements constituting the seal are stationary or fixed in place. The term "dynamic seal" refers to a seal in which the elements constituting the seal are capable of relative movement. In this rotary disc valve, a dynamic seal exists between the seal plate and the diverter seal surface, whereas stationary seals exist between the seal plate and the elastic element, and between the elastic element and the valve body. The rotary disc valve includes a spring that applies a sealing force to the diverter. The spring pushes the diverter against the seal plate to ensure adequate sealing function, and to adapt to the changes in dimension caused by changes in temperature and due to wear of the diverter and seal plate.

In some aspects, a valve includes a valve body and a diverter that is housed in the valve body. The valve body includes a sidewall, and a base that closes one end of the sidewall, the sidewall and the base cooperating to define a chamber. The valve body includes valve ports, each valve port communicating with the chamber. The diverter is disposed in the chamber, and is configured to control fluid flow through the valve body. The diverter includes a diverter sealing surface that faces toward the base, a diverter outer surface that is opposed to the diverter sealing surface and faces away from the base, and diverter through openings that extend between the diverter sealing surface and the diverter outer surface. In addition, the diverter includes a shaft that protrudes from the diverter outer surface in a direction perpendicular to the diverter sealing surface. The shaft is configured to be driven to rotate about a rotational axis. The valve includes a seal assembly disposed in the chamber between the diverter sealing surface and the base. The seal assembly includes a seal sealing surface that faces toward the diverter sealing surface, a seal outer surface that is opposed to the seal sealing surface and faces toward the base, and seal through openings that extend between the seal sealing surface and the seal outer surface. The seal assembly is fixed relative to the base and prevents fluid flow between the diverter and the valve body and between abutting portions of the diverter sealing surface and the seal sealing surface. The diverter is configured to control fluid flow through the valve body in such a way that a) fluid enters the diverter via at least one diverter through opening in a first direction that is parallel to the rotational axis, and b) fluid exits the diverter via at least one diverter through opening in a second direction that is parallel to the rotational axis, the second direction being opposite the first direction.

In some embodiments, the diverter is configured to control fluid flow through the valve body in such a way that, between entering and exiting, fluid flows over a portion of the diverter outer surface.

In some embodiments, the diverter includes a fluid passageway that protrudes from the diverter outer surface, and for some rotational positions of the diverter relative to the valve body, the fluid passageway provides an enclosed fluid path between a first one of the valve ports and a second one of the valve ports.

In some embodiments, the seal assembly includes a first sealing element disposed between the diverter and the base, the first sealing element including the seal sealing surface and being a first material; and a second sealing element disposed between the first sealing element and the base, the second sealing element including the seal outer surface and being a second material, the second material having greater elasticity than the first material.

In some embodiments, the seal assembly comprises a first sealing element stacked with a second sealing element in a direction parallel to the rotational axis.

In some embodiments, portions of the second sealing element have an oval cross-sectional shape.

In some embodiments, each of the first sealing element and the second sealing element include an outer annular portion, an inner annular portion, and struts that extend between the outer annular portion and the inner annular portion. A surface of the outer annular portion of the second sealing element includes a groove. The outer annular portion, the inner annular portion and the struts each have an H-shaped cross-section.

In some embodiments, the seal assembly comprises a first sealing element disposed between the diverter and the base, the first sealing element including the seal sealing surface; and a second sealing element disposed between the first sealing element and the base, the second sealing element including the seal outer surface. The first sealing element is prevented from rotating relative to the valve body via interlocking engagement between a first surface feature disposed on a periphery of the first sealing element and a second surface feature disposed on an inner surface of the sidewall, and the second sealing element is disposed in a groove provided in a diverter-facing surface of the base, and the second sealing element is prevented from rotating relative to the valve body via engagement between the seal outer surface and an inner surface of the groove.

In some embodiments, the seal assembly comprises a first sealing element stacked with a second sealing element in a direction parallel to the rotational axis. The first sealing element has first sealing element through openings. The second sealing element has second sealing element through openings. In addition, the first sealing element through openings have the same shape and dimension as the second sealing element through openings and are axially aligned with the second sealing element through openings.

In some embodiments, the first sealing element through openings and the second sealing element through openings have the shape of a circular sector.

In some embodiments, the seal assembly comprises a first sealing element disposed between the diverter and the base, and a second sealing element disposed between the first sealing element and the base. An axial dimension of the second sealing element is in a range of 3 to 15 times the axial dimension of the first sealing element. Additionally or alternatively, a radial dimension of the second sealing element is less than a radial dimension of the first sealing element.

In some embodiments, the valve includes a lid that closes an open end of the sidewall, and a spring disposed between the lid and the diverter, the spring biasing the diverter toward the base.

In some embodiments, the diverter is disposed on a first side of the seal assembly and the valve ports are disposed on a second side of the seal assembly, and the first side of the seal assembly is opposite the second side of the seal assembly.

In some embodiments, the seal assembly includes a first sealing element disposed between the diverter and the base, and a second sealing element disposed between the first sealing element and the base. In addition, the valve includes a first static seal formed between the first sealing element and the second sealing element, a second static seal formed between the second sealing element and the base, and a dynamic seal formed between the first sealing element and the diverter. The diverter sealing surface is a planar surface that confronts and directly contacts under axial load a planar surface of the first sealing element, thereby realizing the dynamic seal.

DETAILED DESCRIPTION

Figure 1:
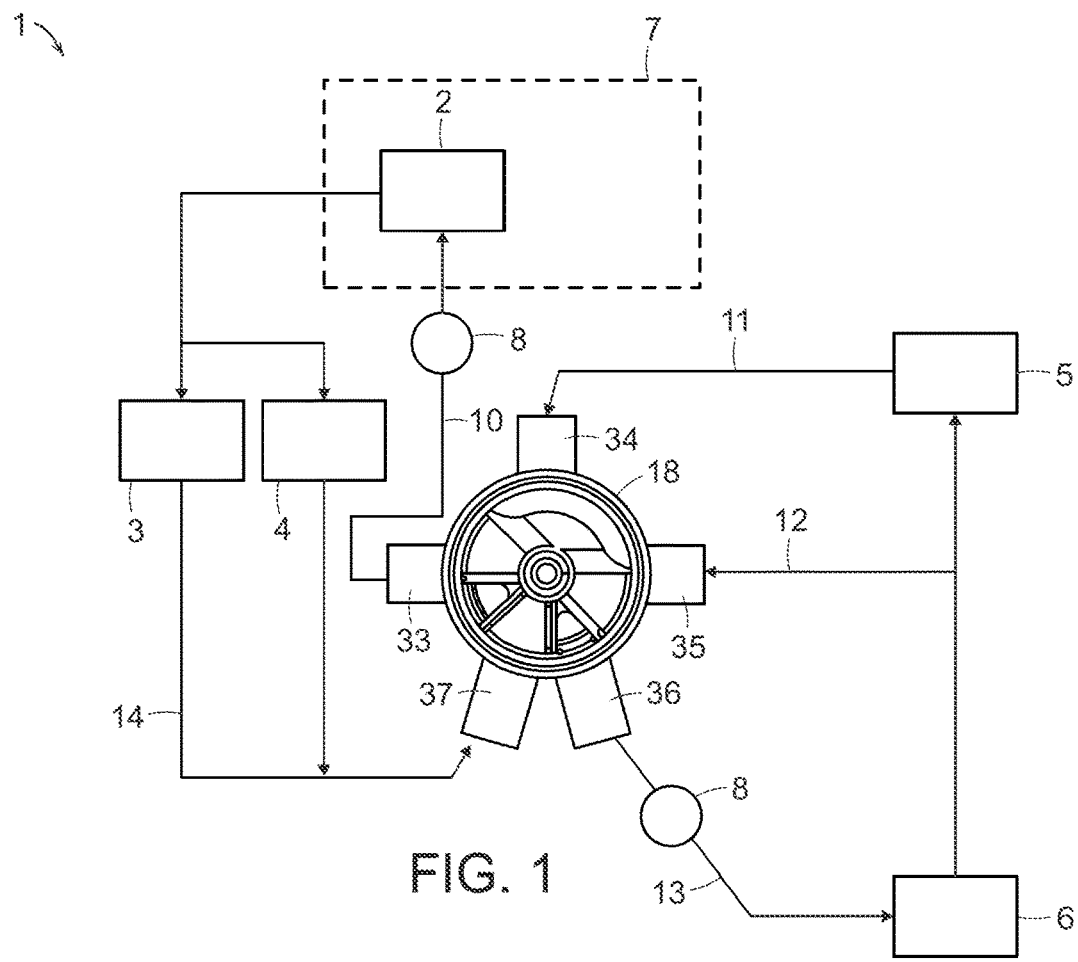
FIG. 1 is a schematic of a vehicle cooling system including a single-level, multi-port rotary disc valve.
Figure 2:
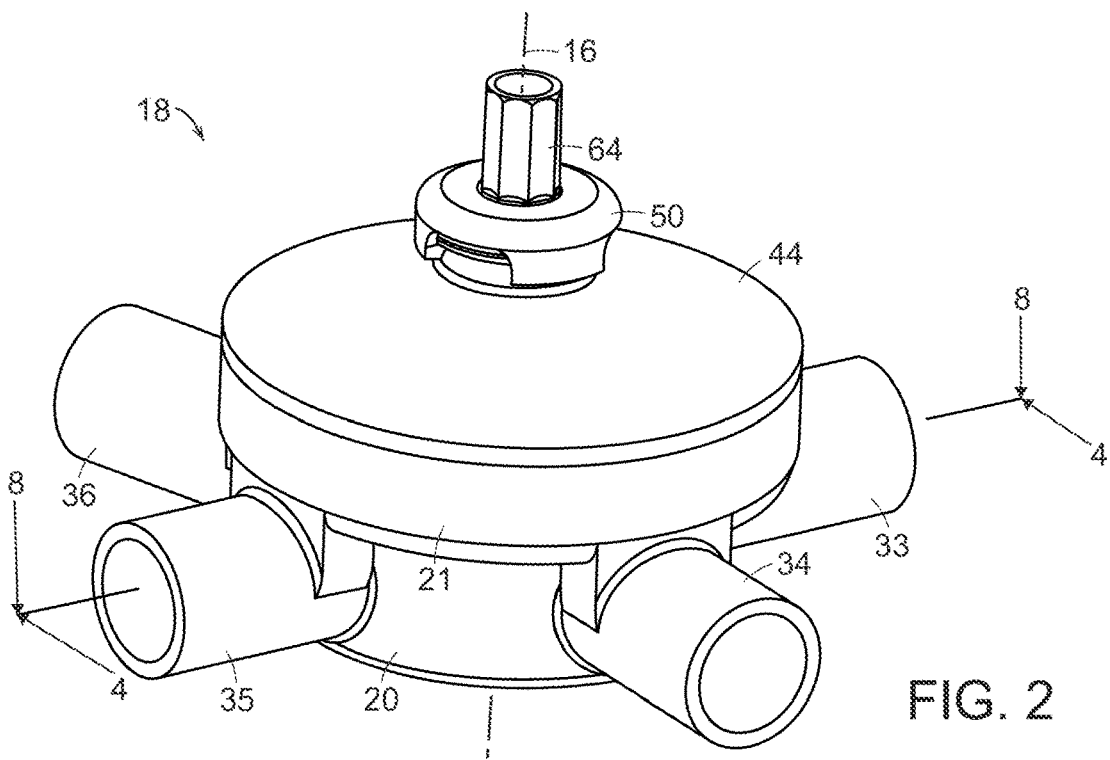
FIG. 2 is a perspective view of the rotary disc valve.

Referring to FIGS. 1-4, a fluid delivery system 1 includes a multi-port rotary disc valve 18 that is capable of controlling fluid flow driven by pumps 8 between three, four, five or more individual fluid lines 10, 11, 12, 13, 14 within the system 1. The rotary disc valve 18 may be used, for example, to control the distribution and flow of coolant in a cooling system 1 of an electric vehicle. In this example, the rotary disc valve 18 may control flow of coolant fluid between the rotary disc valve 18 and a radiator 2 that is part of a vehicle passenger cabin heating and cooling system 7, where coolant from the radiator 2 may also cool a battery 3 and battery management system 4. In addition, the rotary disc valve 18 may control fluid flow to heat exchangers 5, 6 that support temperature control of other vehicle devices and systems, such as an electric drive motor, vehicle electronics and/or electronic control units and/or the oil supply. The rotary disc valve 18 includes a valve body 20 and a diverter 60 that is disposed in the valve body 20. The diverter 60 includes a valve shaft 64 that protrudes through a lid 44 that closes an open end of the valve body 20. The valve shaft 64 is configured to be connected to a valve actuator (not shown). Upon actuation, the valve shaft 64 and the diverter 60 rotate relative to, the valve body 20 about a rotational axis 16, and the rotational orientation of the diverter 60 relative to the valve body 20 is set via the valve actuator. In addition, the rotary disc valve 18 has a seal assembly 80 that provides a fluid-tight seal between the valve body 20 and the diverter 60. The valve body 20 includes multiple valve ports 33, 34, 35, 36, 37, the number of valve ports being determined by the specific application. The rotational orientation of the diverter 60 relative to the valve body 20 determines one or more fluid flow paths through corresponding ones of the valve ports 33, 34, 35, 36, 37, whereby the distribution of coolant fluid in the coolant system 1 is controlled. Details of the rotary disc valve 18, including the valve body 20, the diverter 60 and the seal assembly 80, will now be described.

Referring to FIGS. 2-8, the valve body 20 includes a sidewall 21, and a base 26 that closes one end (referred to here as the "base end") 22 of the sidewall 21. The sidewall 21 is a revolved section and has a circular profile when viewed in a direction parallel to the rotational axis 16. Although the sidewall 21 as illustrated in cylindrical, it could alternatively be, for example, conical or ellipsoidal. The sidewall 21 is joined at the base end 22 to a peripheral edge of the base 26, and the sidewall 21 surrounds the base 26. The sidewall 21 and the base 26 together form a generally cup-shaped structure that defines a valve chamber 29 therein.

The valve body 20 includes chamber walls 30 that segregate the valve chamber 29 into subchambers 32. One valve port 33, 34, 35, 36, 37 communicates with each subchamber 32, and each subchamber 32 is isolated from the other subchambers 32. The chamber walls 30 have exposed ends 31 that are spaced apart from the base 26 and intersect the sidewall 21. The exposed ends 31 of the chamber walls 30 are aligned with a first plane 40 that is perpendicular to the rotational axis 16 and intersects the sidewall 21 at an axial location between the sidewall open end 23 and the valve ports 33, 34, 35, 36, 37. For each valve port, the exposed end 31 of the corresponding chamber wall 30 defines a subchamber axial opening 38, also referred to as the "non-valve port opening" of the corresponding subchamber 32.

The valve body 20 includes a platform 24 that protrudes inward from an inner surface of the sidewall 21 and extends between adjacent pairs of chamber walls 30. The platform 24 is axially located between the sidewall base end 22 and the first plane 40 so as to be closely adjacent to, and recessed relative to, the chamber wall exposed ends 31. The platform 24 and the chamber wall exposed ends 31 cooperate to provide a wide, shallow platform channel 28 that receives and supports the seal assembly 80, as discussed further below.

The valve body 20 includes a post 25 that protrudes axially from the platform 24 toward the sidewall open end 23. The post 25 is coaxial with the rotational axis 16, and has a polygonal profile when viewed in a direction parallel to the rotational axis 16. In the illustrated embodiment, the post 25 has a pentagonal cross-sectional shape when viewed in a direction parallel to the rotational axis 16. The post 25 acts as an assembly aid and prevents rotation of portions of the seal assembly 80 with respect to the valve body 20. The post 25 is received in central openings 91, 105 of the first and second sealing elements 86, 100 of the seal assembly 80, which each have a corresponding cross-sectional shape, as discussed in detail below.

The valve body 20 includes sidewall ribs 39 that protrude inward from inner surface of the sidewall 21. The sidewall ribs 39 are spaced apart along an inner circumference of the sidewall 21. The sidewall ribs 39 extend axially, beginning at the platform 24, and terminating at a location that is spaced apart from the sidewall open end 23. The sidewall ribs 39 are configured to engage with a portion of the seal assembly 80, as discussed further below.

In the illustrated embodiment, the valve body 20 includes five valve ports 33, 34, 35, 36, 37, but is not limited to this number of valve ports. In particular, the valve body 20 includes a first valve port 33, a second valve port 34, a third valve port 35, a fourth valve port 36 and a fifth valve port 37. Each of the valve ports 33, 34, 35, 36, 37 protrudes outward from the sidewall 21 along a radius of the rotational axis 16, and communicates with a corresponding subchamber 32. The valve ports 33, 34, 35, 36, 37 extend within a common second plane 42 that is perpendicular to the rotational axis 16 and intersects the sidewall 21 at an axial location between the first plane 40 and the sidewall base end 22.

In the illustrated embodiment, the valve ports 33, 34, 35, 36, 37 are cylindrical tubes, and each valve port 33, 34, 35, 36, 37 forms a circular opening at the intersection with the valve body sidewall 21. Although, as illustrated, the valve ports 33, 34, 35, 36, 37 each have the same length, cross-sectional shape and dimensions, the valve ports 33, 34, 35, 36, 37 are not limited to this configuration. Moreover, the valve ports 33, 34, 35, 36, 37 are not limited to the illustrated co-planar and radially oriented configuration. For example, in other embodiments, one or more of the valve ports 33, 34, 35, 36, 37 may be non-co-planar with the other valve ports and/or may protrude from the base rather than the sidewall. The valve ports 33, 34, 35, 36, 37 may protrude in a direction that is parallel to the rotational axis 16, in a direction that is perpendicular to the rotational axis 16 or at any angle between perpendicular and parallel to the rotational axis 16. The valve ports 33, 34, 35, 36, 37 may protrude non-radially; an axis of a given valve port is not required to intersect the rotational axis 16. In many applications, the configuration of the valve ports 33, 34, 35, 36, 37 is determined by packaging requirements.

The valve ports 33, 34, 35, 36, 37, are provided at spaced-apart locations about a circumference of the sidewall 21. In the illustrated embodiment, the first and third valve ports 33, 35 are disposed on opposed sides of the valve body 20, extend in parallel to a common diameter of the valve body 20. The second valve port 34 is disposed midway between the first and third valve ports 33, 35. The fourth and fifth valve ports 36, 37 are on the opposite side of the valve body 20 relative to the second valve port 34. In other embodiments, the valve ports 33, 34, 35, 36, 37 may have a different spacing than shown, as determined by the specific application.

The rotary disc valve 18 includes the lid 44 that closes the open end of the valve body 20. The lid 44 includes an integral cylindrical sleeve 46 that is coaxial with the rotational axis 16 and extends from both the inner and outer surfaces of the lid 44. The sleeve 46 has a non-uniform inner diameter, and a shoulder 48 is disposed at the transition between a larger-diameter portion 46(1) and a smaller-diameter portion 46(2). The larger diameter portion 46(1) and the shoulder 48 reside outside the lid 44, whereas the smaller diameter portion 46(2) is substantially disposed on the inside of the lid 44. The smaller diameter portion 46(2) has an inner diameter that is dimensioned to receive the valve shaft 64 in a clearance fit, for example a running fit, whereby the smaller diameter portion 46(2) serves as a bushing of the valve shaft 64. The larger diameter portion 46(1) includes an annular flange 49 that protrudes radially outward from an outer surface of the sleeve large diameter portion 46(1). The flange 49 may extend continuously about the entire outer circumference of the sleeve 46, and is axially offset relative to the shoulder 48.

A shaft seal 43 is disposed between the valve shaft 64 and the sleeve large diameter portion 46(1). The shaft seal 43 provides a fluid seal between the valve shaft 64 and the sleeve 46. The shaft seal 43 is annular and may be formed of an elastomer that is compatible with automotive coolant, such as ethylene propylene diene monomer (EPDM). In the illustrated embodiment, the shaft seal 43 is an O-ring having an "X" cross-sectional shape. In other embodiments, the shaft seal 43 may have other cross-sectional shapes, such as, but not limited to, rectangular, oval or "I" shapes.

Referring to FIGS. 2-4 and 30-32, the shaft seal 43 is retained on the valve shaft 64 at an axial location corresponding to the sleeve large diameter portion 46(1) via a retaining cap 50. The retaining cap 50 includes an end plate 56 that surrounds the valve shaft 64, a collar 51 that protrudes from an inner periphery 56(1) of the end plate 56 and latches 52 that protrude from an outer periphery 56(2) of the end plate 56. The end plate 56, in use, is generally perpendicular to the rotational axis 16. The end plate 56 has an inner surface 58 that faces the lid 44, an outer surface 57 that faces away from the lid 44 and a circular profile when viewed in a direction parallel to the rotational axis 16. The end plate 56 has a central opening 59 that receives the valve shaft 64 and defines the end plate inner periphery 56(1).

The collar 51 extends continuously along the end plate inner periphery 56(1) and protrudes inward from the endplate inner surface 58. In use, the collar 51 resides between the sleeve 46 and the valve shaft 64 such that an end face 51(1) of the collar 51 faces the shoulder 48 with the shaft seal 43 disposed between the collar end face 51(1) and shoulder 48.

The latches 52 are spaced apart along the end plate outer periphery 56(2) and protrude inward from the endplate inner surface 58 toward the lid 44. In the illustrated embodiment, the retaining cap 50 includes three latches 52 that are equally spaced apart along the end plate outer periphery 56(2). Each latch 52 includes a leg portion 52(1) and a hook portion 52(2). A proximal end of the leg portion 52(1) is integral with the end plate 56, and the leg portion 52(1) extends in parallel to the rotational axis 16. An axial dimension of the leg portion 52(1) is sufficient to position the distal end of the leg portion 52(1) at a location corresponding to the flange 49 that protrudes radially outward from an outer surface of the sleeve large diameter portion 46(1). The hook portion 52(2) is disposed at the distal end of the leg portion 52(1), and protrudes radially toward the valve shaft 64. The hook portion 52(2) is axially offset relative to the end face 51(1) of the collar 51, and forms an interference or snap-fit engagement with the flange 49. By this configuration, the retaining cap 50 is retained on the lid 44, with the shaft seal 43 trapped between the end face 51(1) of the collar 51 and the shoulder 48. As a result, the shaft seal 43 is retained on the valve shaft 64 via the retaining cap 50.

Referring to FIGS. 3-4 and 9-11, the diverter 60 is disposed in the valve chamber 29, and is rotatable relative to the valve body 20 about the rotational axis 16. The diverter 60 is generally disc shaped, and includes a diverter sealing surface 61 that faces toward the base 26, and a diverter outer surface 62 that is opposed to the diverter sealing surface 61 and faces away from the base 26. The diverter sealing surface 61 is planar (e.g., flat or level and smooth, without raised areas, protrusions, recesses, indentations or surface features or irregularities). The diverter sealing surface 61 faces and directly contacts a corresponding flat surface 81 of the seal assembly 80, as discussed in detail below.

The diverter 60 includes a valve shaft 64 that protrudes from the center of the diverter outer surface 62 in a direction perpendicular to the diverter sealing surface 61. The valve shaft 64 is configured to be connected to an output shaft of the valve actuator, which drives the valve shaft 64 to rotate about the rotational axis 16. For example, in the illustrated embodiment, the outer surface of the valve shaft 64 may include flats (shown), splines or other features that permit engagement with an output structure of the valve actuator.

Figure 10:
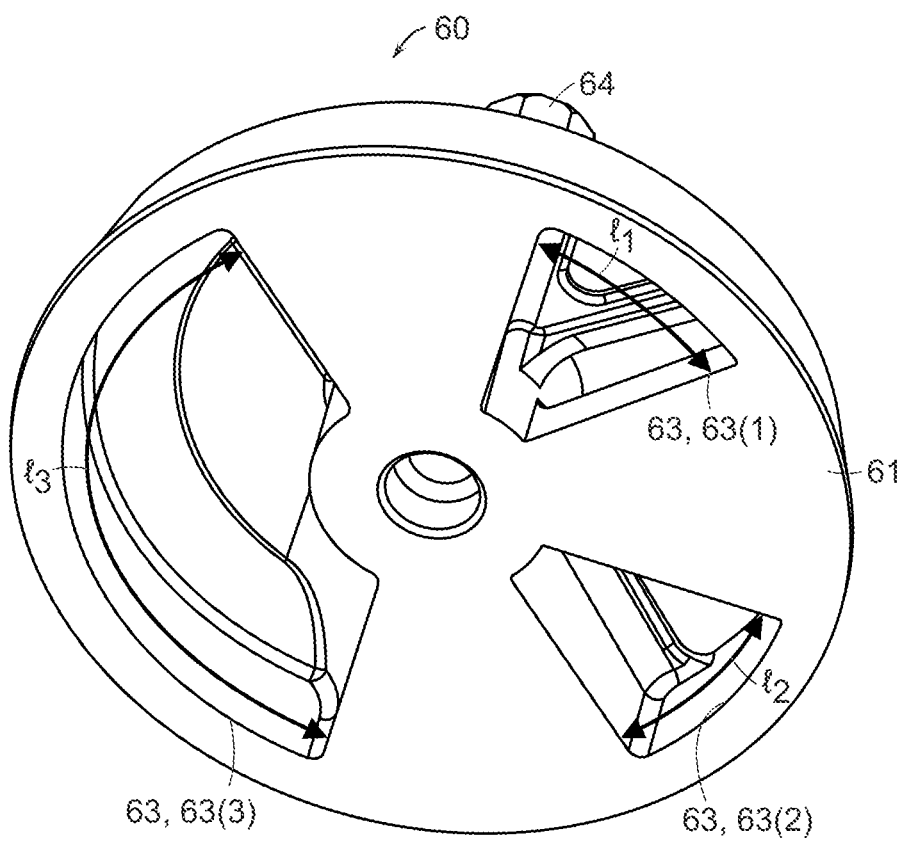
FIG. 10 is a bottom perspective view of the diverter.
Figure 11:
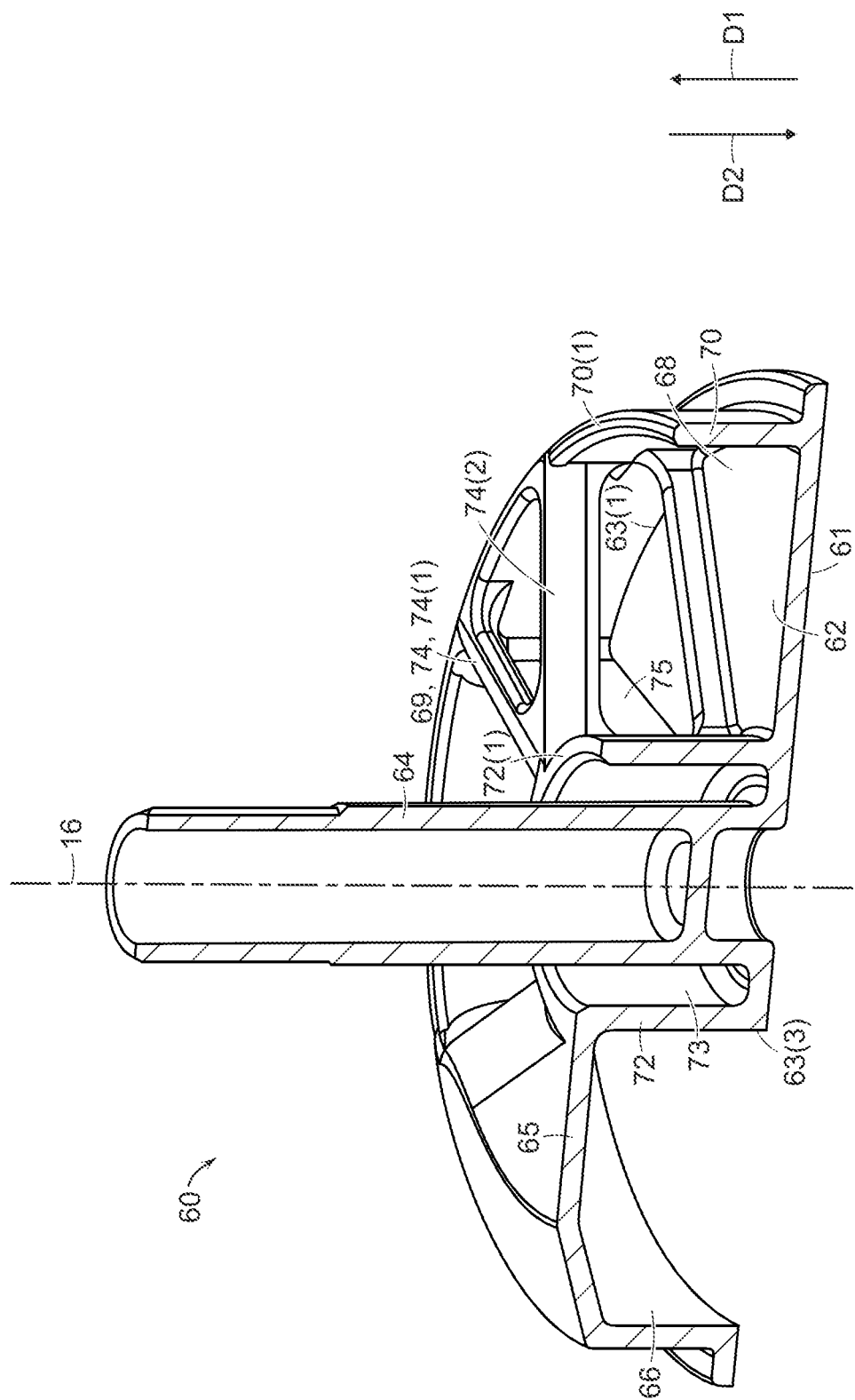
FIG. 11 is a cross-sectional view of the diverter as seen along line 11-11 of FIG. 9.
Figure 12:
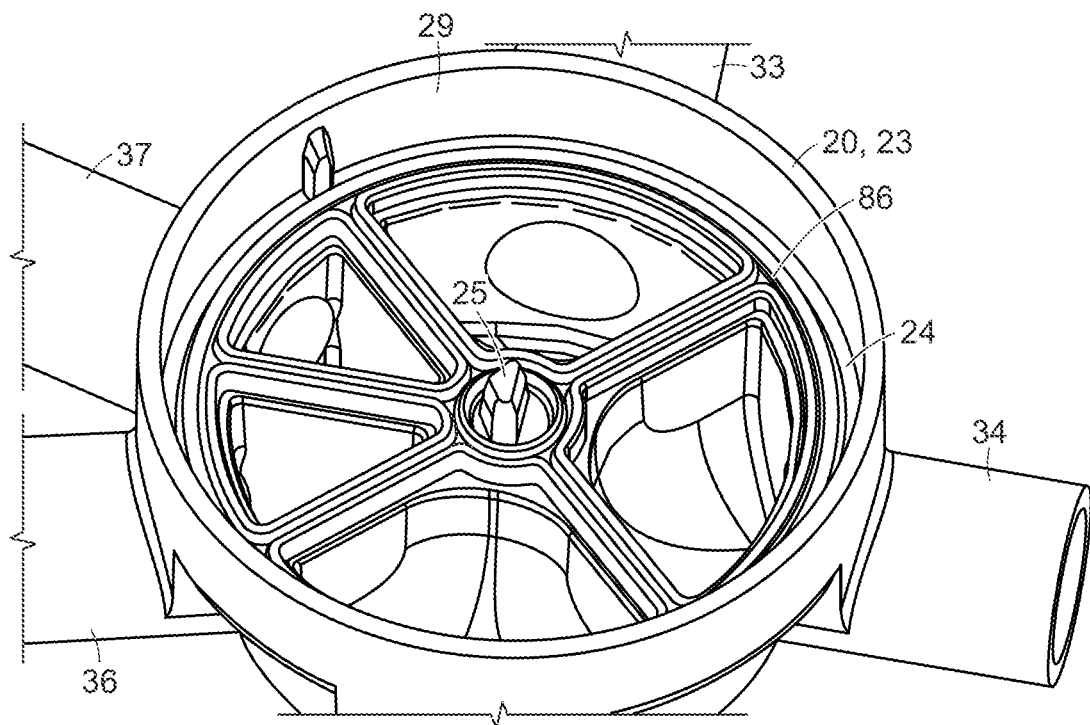
FIG. 12 is a top perspective view of the valve body with the elastic element disposed in the valve chamber.
Figure 13:
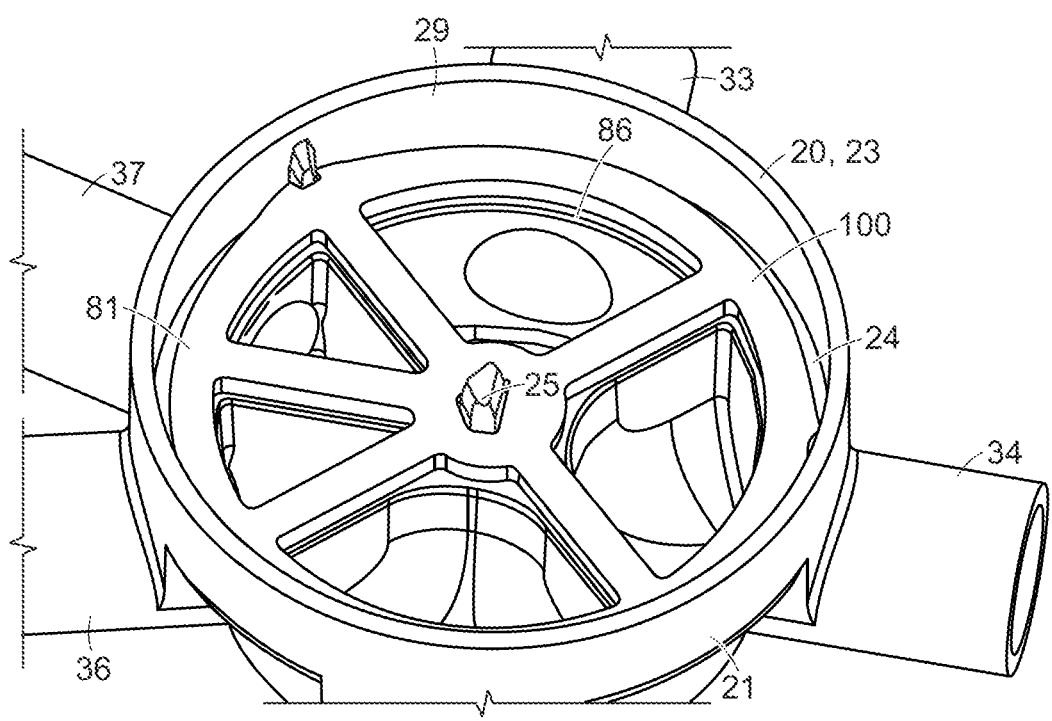
FIG. 13 is a top perspective view of the valve body with the elastic element and seal plate disposed in the valve chamber.
Figure 14:
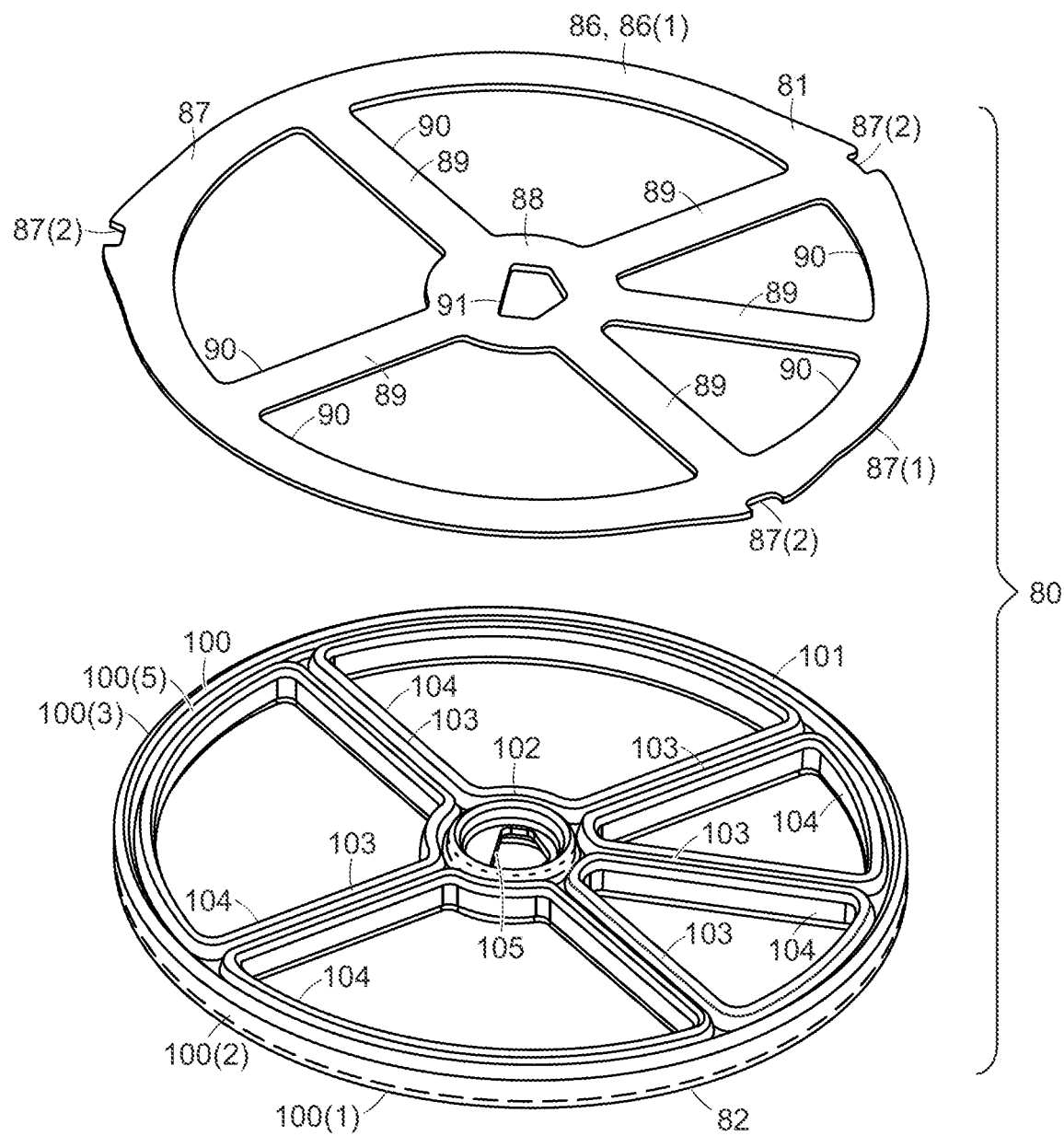
FIG. 14 is an exploded view of the seal assembly.
Figure 15:
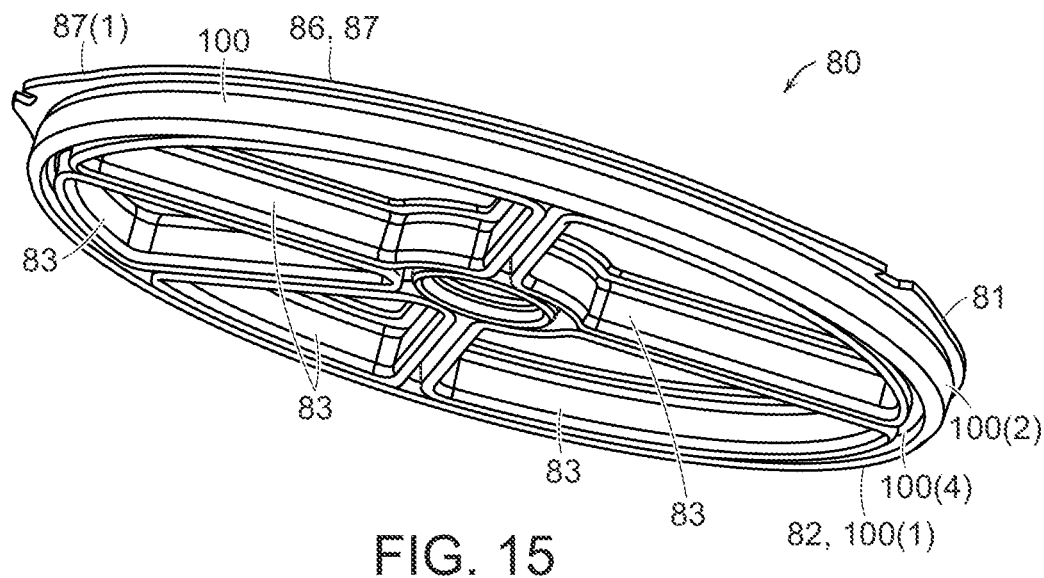
FIG. 15 is a bottom perspective view of the seal assembly.
Figure 16:
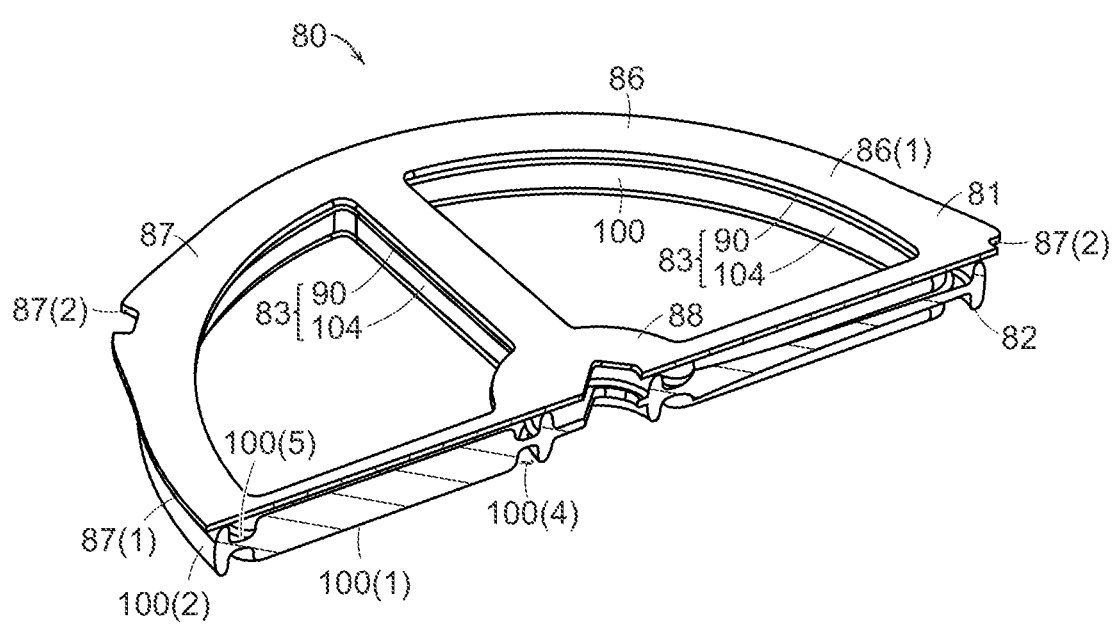
FIG. 16 is a cross-sectional view of the seal assembly.

The diverter 60 includes diverter through openings 63 having a circular sector-shaped profile when the diverter 60 is viewed in a direction parallel to the rotational axis 16. The diverter through openings 63 extend between the diverter sealing surface 61 and the diverter outer surface 62, whereby fluid enters and exits the diverter 60 in a direction that is parallel to the rotational axis 16. In the illustrated embodiment, the diverter 60 includes three diverter through openings 63(1), 63(2) and 63(3) that are spaced apart from each other. The first and second diverter through openings 63(1), 63(2) have a small arc length as compared to that of the third diverter through opening 63(3). For example, in the illustrated embodiment, the first and second diverter through openings 63(1), 63(2) have an arc length C1, (2 in a range of 30 degrees to 60 degrees and the third diverter through opening 63(3) has an arc length (3 in a range of 60 degrees to 120 degrees (FIG. 10).

The diverter 60 includes a dome 65 that protrudes from the diverter outer surface 62 and overlies the third diverter through opening 63(3). In particular, the dome 65 encloses a portion of a periphery of the third diverter through opening 63(3) whereby, for certain rotational positions of the diverter 60 relative to the valve body 20, fluid entering the third diverter through opening 63(3) from one valve body subchamber 32 may be redirected to an adjacent valve body subchamber 32. Thus, the dome 65 provides a "closed" first fluid passageway 66 within the rotary disc valve 18.

The first and second diverter through openings 63(1), 63(2) are not enclosed by a dome, and fluid entering one of the first and second diverter through openings 63(1), 63(2) from a respective subchamber 32 is constrained by the valve body 20 and lid 44 and redirected toward the other of the first and second diverter through openings 63(1), 63(2). For example, after entering the diverter via the first diverter through opening 63(1), and before exiting the diverter 60 via the second diverter through opening 63(2), fluid passes over a portion the diverter outer surface 62. In other words, for certain rotational positions of the diverter 60 relative to the valve body 20, fluid entering the first diverter through opening 63(1) from a corresponding first valve body subchamber 32(1) may be redirected to a second valve body subchamber 32(2) via an "open" second fluid passageway 68 within the rotary disc valve 18, the second fluid passageway 68 passing over the diverter outer surface 62.

It is understood that the size and spacing of the first, second and third diverter through openings 63(1), 63(2). 63(3), as well as the shape and size of the dome 65, are exemplary and in practice will depend on the specific application.

In the illustrated embodiment, the diverter 60 is formed of a plastic such as Polyoxymethylene (POM) or Polyphenylene Sulfide (PPS). To provide increased structural integrity, including resistance to bending or flexion of the diverter 60, the diverter 60 may include a stiffening superstructure 69. In the illustrated embodiment, the superstructure 69 includes an annular outer rim 70, an annular inner rim 72 and spokes 74 that extend between the outer rim 70 and the inner rim 72. The outer rim 70 protrudes outward from a peripheral edge of the diverter outer surface 62, and extends about the entire circumference of the outer surface 62. In the illustrated embodiment, the outer rim 70 provides a portion of the dome 65 that encloses the third diverter through opening 63(3). The inner rim 72 protrudes outward from the diverter outer surface 62 an axial distance that is slightly greater than that of the outer rim 70. The inner rim 72 closely surrounds the valve shaft 64. An annular groove 73 is disposed between the inner rim 72 and the valve shaft 64 which is shaped and dimensioned to receive an end 54(2) of a spring 54 therein.

The spokes 74 extend between free ends 70(1), 72(1) of the outer and inner rims 70, 72, contributing to the stiffening effect of the superstructure 69. In the illustrated embodiment, the diverter 60 has four spokes 74(1), 74(2), 74(3), 74(4), including a first pair 74(1), 74(2) of spokes 74 that overlie the radii that define the circular sector-shape of the first diverter through opening 63(1), and a second pair 74(3), 74(4) of spokes 74 that overlie the radii that define the circular sector-shape of the second diverter through opening 63(2). In addition, a first partition wall 75 extends between the outer and inner rims 70, 72 at a location corresponding to the first spoke 74(1), and a second partition wall 76 extends between the outer and inner rims 70, 72 at a location corresponding to the fourth spoke 74(4). The partition walls 75, 76 retain fluid within the second fluid passageway 68 and direct fluid into the adjacent first or second diverter through opening 63(1), 63(2). In addition, the partition walls 75, 76 form part, and enhance the stiffening effect, of the superstructure 69.

Referring to FIGS. 4 and 12-16, the seal assembly 80 is disposed in the valve chamber 29 between the diverter sealing surface 61 and the base 26 of the valve body 20, more particularly between the diverter sealing surface 61 and the platform 24. The seal assembly 80 includes a seal sealing surface 81 that faces toward, and directly contacts, the diverter sealing surface 61, and a seal outer surface 82 that is opposed to the seal sealing surface 81 and faces toward the base 26. In addition, the seal assembly 80 includes seal through openings 83 that extend between the seal sealing surface 81 and the seal outer surface 82. In certain rotational positions of the diverter 60, a subset of seal through openings 83 are aligned with one or more of the diverter through openings 63. The seal assembly 80 is fixed relative to the valve body 20, and prevents fluid flow between the diverter 60 and the valve body 20, and between abutting portions of the diverter sealing surface 61 and the seal sealing surface 81.

The seal assembly 80 is an assembly of two sealing elements. The first sealing element, referred to as the seal plate 86, is disposed between the diverter 60 and the base 26. The second sealing element, referred to as the elastic element 100, is disposed between the seal plate 86 and the base 26. The seal plate 86 is stacked with the elastic element 100 in a direction parallel to the rotational axis 16.

The seal plate 86 includes a plate outer annular portion 87, a plate inner annular portion 88, and plate struts 89 that extend between the plate outer annular portion 87 and the plate inner annular portion 88, giving the seal plate 86 the appearance of a spoked wheel when viewed in a direction parallel to the rotation axis 16. The seal plate 86 has plate through openings 90, which are defined between the plate outer and inner annular portions 87, 88 and each pair of adjacent plate struts 89. By this configuration, the plate through openings 90 are each generally circular sector shaped. The plate struts 89 are not equidistantly spaced, whereby the respective plate through openings 90 do not each have the same arc length.

The plate inner annular portion 88 has a central opening 91 having a cross-sectional shape and dimension corresponding to the cross-sectional shape and dimension of the valve body post 25. In the illustrated embodiment, the central opening 91 has a pentagonal shape and receives the post 25 in a clearance fit, for example a location fit, whereby the seal plate 86 can be assembled with the valve body 20 in a predetermined orientation.

The plate outer annular portion 87 has a plate peripheral surface 87(1) that faces the sidewall 21. Rectangular notches 87(2) are provided in the plate peripheral surface 87(1). The notches 87(2) are spaced apart along the circumference of the plate outer annular portion 87 and open facing the sidewall 21. The notches 87(2) are shaped and dimensioned to receive the sidewall ribs 39 in a clearance fit, for example a location fit. The sidewall ribs 39 engage the notches 87(2), whereby the seal plate 86 is prevented from rotating relative to the valve body 20. In the illustrated embodiment, the plate peripheral surface 87(1) is generally circular, and slightly protrudes radially outward in the vicinity of the notches 87(2).

The diverter-facing surface 86(1) of the seal plate 86 and the base-facing surface 86(2) of the seal plate 86 are planar (e.g., flat or level and smooth, without raised areas, protrusions, recesses, indentations or surface features or irregularities). The diverter-facing surface 86(1) provides the seal sealing surface 81 of the seal assembly 80. In particular, the diverter-facing surface 86(1) faces toward, and directly contacts, the diverter sealing surface 61. Since the diverter 60 rotates relative to the seal plate 86 during valve use, seal plate 86 is rigid, and is formed of a highly wear resistive plastic. In some embodiments, for example, the seal plate 86 is an ultra-high molecular weight polyethylene.

The seal plate 86 is a thin plate in that the axial dimension, or thickness, of the seal plate 86 is much less than the dimension of the seal plate 86 in a direction perpendicular to the axial dimension (e.g., much less than the diameter of the seal plate 86). For example, in the illustrated embodiment, the diameter of the seal plate 86 may be in a range of 80 times the seal plate thickness to 160 times the seal plate thickness.

The elastic element 100 includes an element outer annular portion 101, an element inner annular portion 102, and element struts 103 that extend between the element outer annular portion 101 and the element inner annular portion 102, giving the elastic element 100 the appearance of a spoked wheel when viewed in a direction parallel to the rotation axis 16. The elastic element 100 has element through openings 104, which are defined between the element outer and inner annular portions 101, 102 and each pair of adjacent element struts 103. By this configuration, the element through openings 104 are each generally circular sector shaped. The element struts 103 are not equidistantly spaced, whereby the respective element through openings 104 do not each have the same arc length. The element through openings 104 are aligned with corresponding ones of the seal plate through openings 90, and each element through opening 104 has the same shape and dimension as the seal plate through opening 90 with which it is aligned. By this configuration, the plate and element through openings 90, 104 provide the seal through openings 83 of the seal assembly 80.

The element inner annular portion 102 has a central opening 105 having a cross-sectional shape and dimension corresponding to the cross-sectional shape and dimension of the valve body post 25. In the illustrated embodiment, the central opening 105 has a pentagonal shape and receives the post 25 in a clearance fit, for example a location fit, whereby the elastic element 100 can be assembled with the valve body 20 in a predetermined orientation.

The base-facing surface 100(1) of the elastic element 100 provides the seal outer surface 82 of the seal assembly 80, and the base-facing surface 100(1) faces toward, and directly contacts, the platform 24. More particularly, the elastic element 100 rests in the platform channel 28 which is shaped and dimensioned to receive the elastic element base-facing surface 100(1) and peripheral edges 100(2) in a clearance fit, for example a sliding fit. The engagement between the elastic element peripheral edges 100(2) and surfaces of the platform channel 28 serves to prevent relative rotation of the elastic element 100 relative to the valve body 20. Thus, both the elastic element 100 and the seal plate 86 are fixed relative to the valve body 20.

The elastic element 100 has a greater elasticity than the seal plate 86. In addition, the elastic element 100 is formed of an elastic material that is compatible with the fluid that flows through the rotary disc valve 18 and meets the requirements for operating temperature and durability. For example, when the rotary disc valve 18 is used to control fluid in a vehicle coolant system, the elastic element 100 is formed of an elastomer that is compatible with automotive coolant, such as ethylene propylene diene monomer (EPDM).

In addition to material selection, the softness and resilience of the elastic element 100 may be further increased and/or optimized by providing the element outer and inner annular portions 101, 102 and the element struts 103 with an irregular cross-sectional shape. For example, in some embodiments, the element outer and inner annular portions 101, 102 and the element struts 103 may include a non-circular and non-rectangular cross-sectional shape. In the illustrated embodiment, the base-facing surface 100(1) of the elastic element 100 includes a first groove 100(4) that extends along each of the element outer and inner annular portions 101, 102 and the element struts 103. In addition, the lid-facing surface 100(3) of the elastic element 100 includes a second groove 100(5) that extends along each of the element outer and inner annular portions 101, 102 and the element struts 103. As a result, the element outer annular portion 101, the element inner annular portion 102, and the element struts 103 of the elastic element 100 each have an H shaped cross-section.

The elastic element 100 is thin in that the axial dimension, or thickness, of the elastic element 100 is much less than the dimension of the elastic element 100 in a direction perpendicular to the axial dimension (e.g., much less than the diameter of the elastic element 100). For example, in the illustrated embodiment, the diameter of the elastic element 100 may be in a range of 10 times the elastic element thickness to 20 times the elastic element thickness. However, the thickness of the elastic element 100 is greater than the thickness of the seal plate 86. For example, in the illustrated embodiment, the thickness of the elastic element 100 is in a range of 3 times to 15 times the thickness of the seal plate 86. In addition, the diameter of the elastic element 100 is slightly less than a diameter of the seal plate 86, and a diameter of the diverter sealing surface 61 is the same as the diameter of the seal sealing surface 81 (e.g. the same as the diverter-facing surface 86(1) of seal plate 86).

Figure 3:
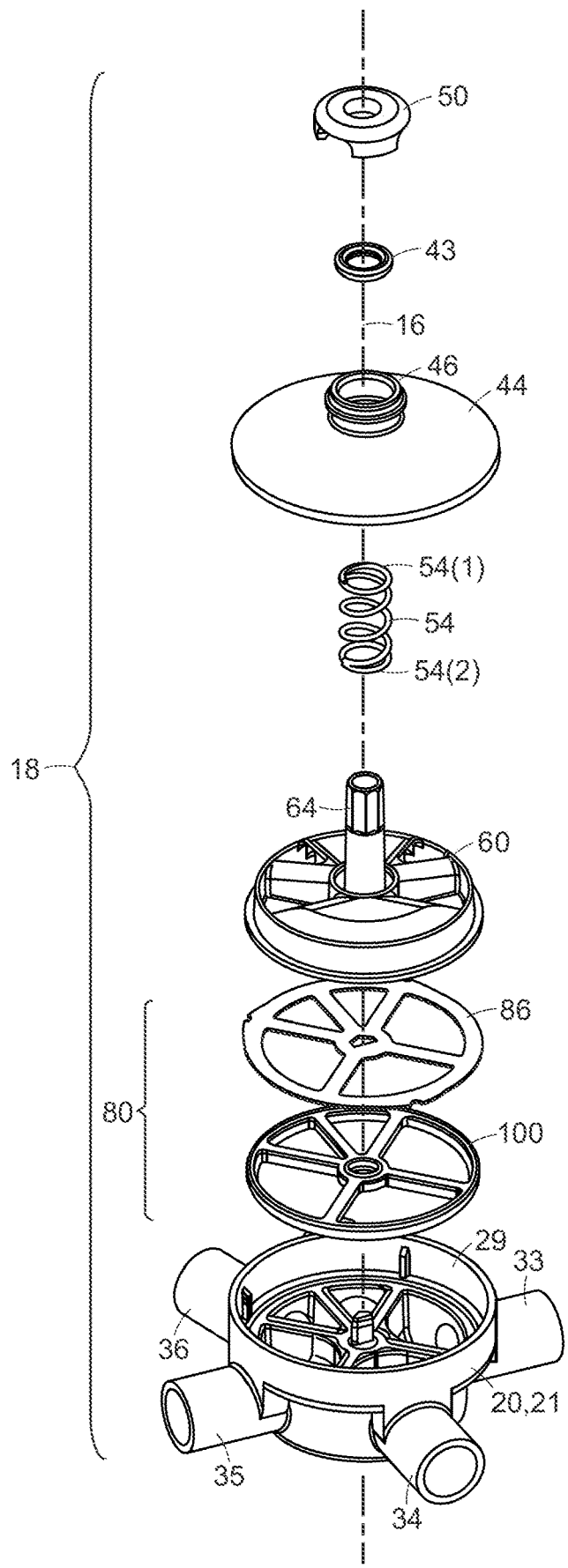
FIG. 3 is an exploded perspective view of the rotary disc valve.
Figure 4:
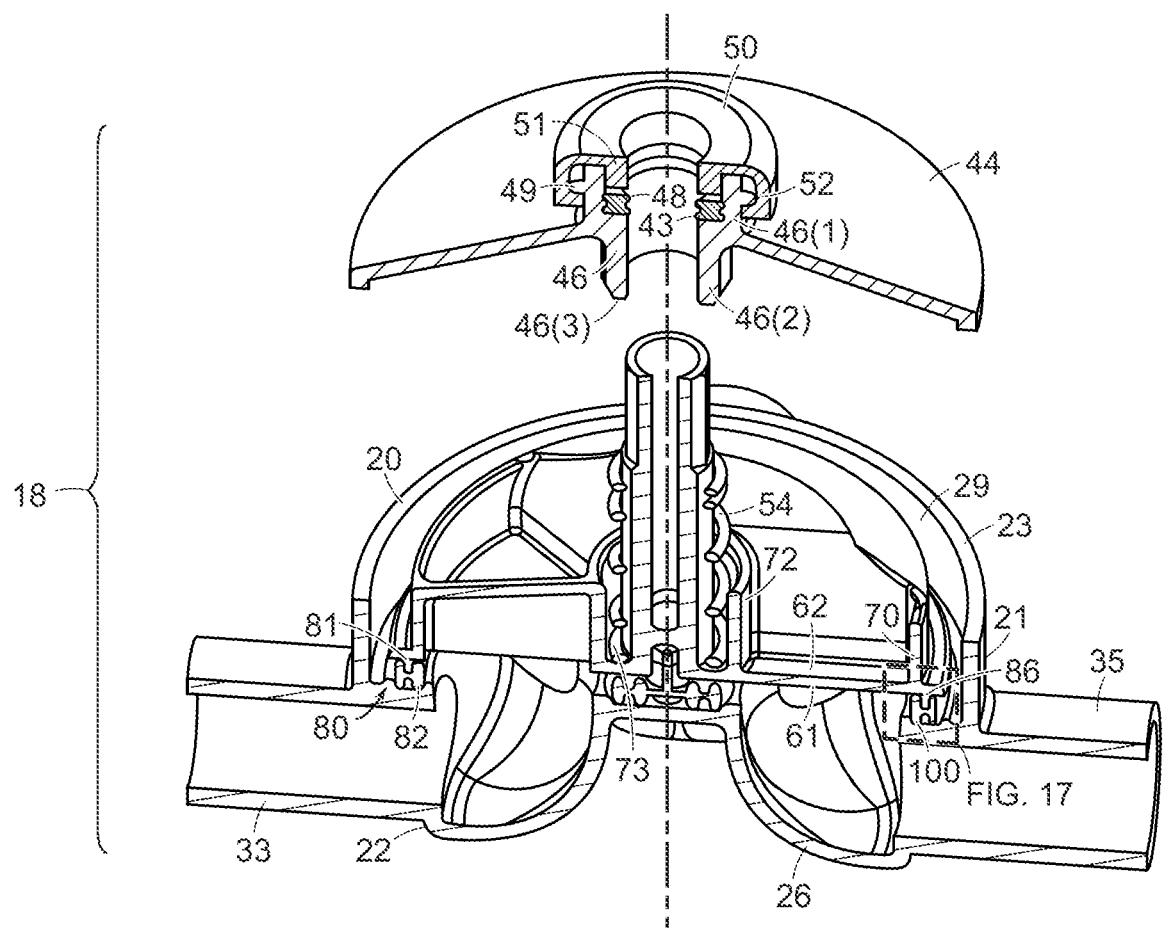
FIG. 4 is a partially exploded cross-sectional view of the rotary disc valve as seen along line 4-4 of FIG. 2.
Figure 5:
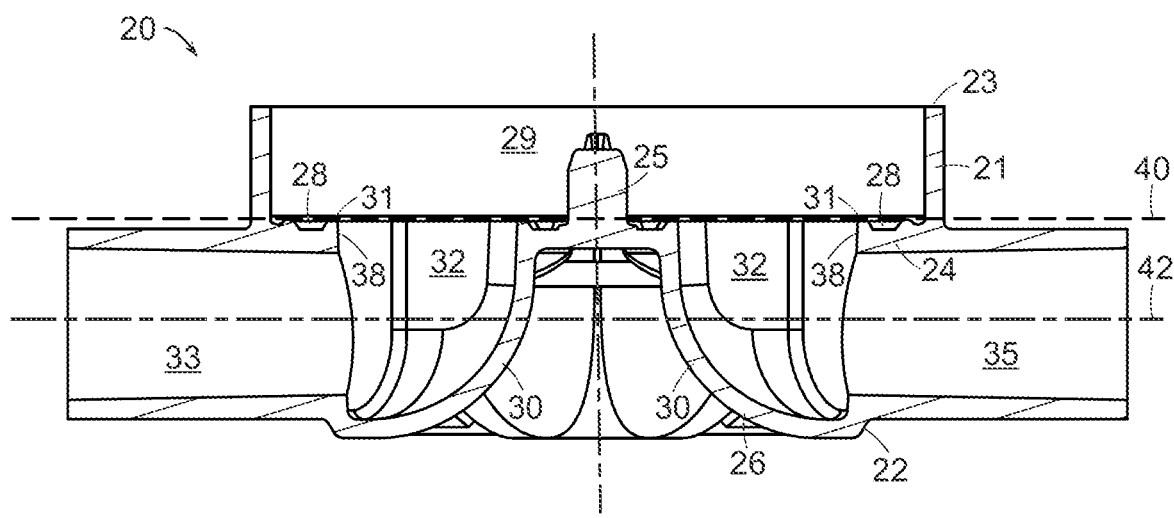
FIG. 5 is a cross-sectional view of the valve body as seen along line 4-4 of FIG. 2.
Figure 6:
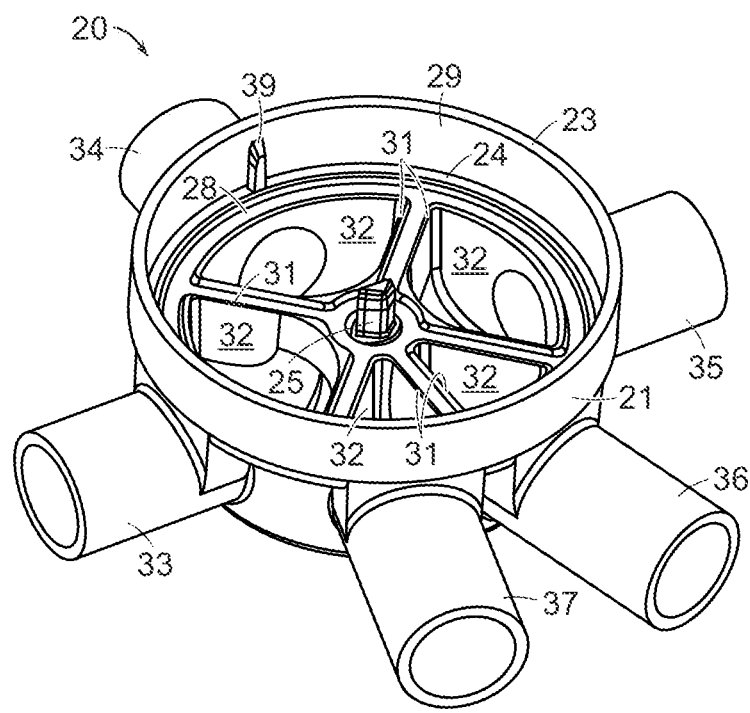
FIG. 6 is a top perspective view of the valve body.
Figure 7:
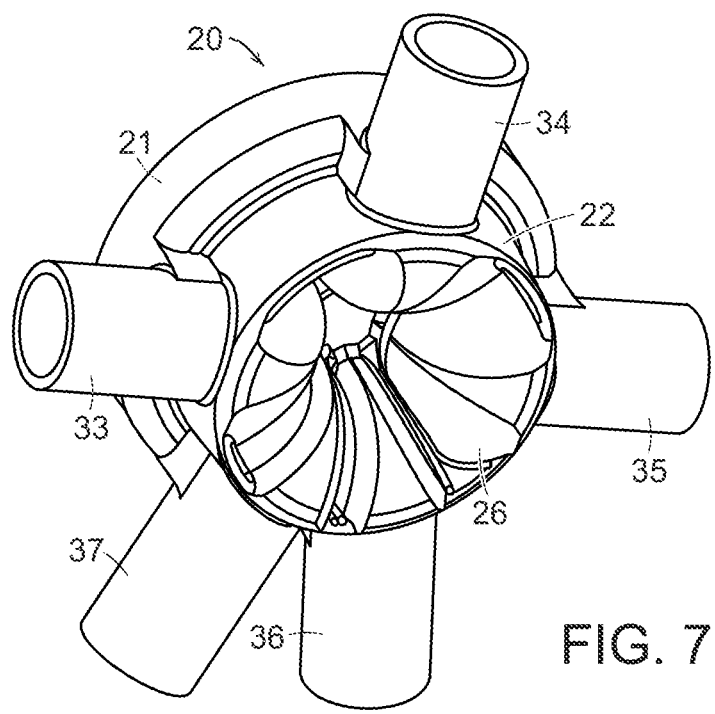
FIG. 7 is a bottom perspective view of the valve body.
Figure 8:
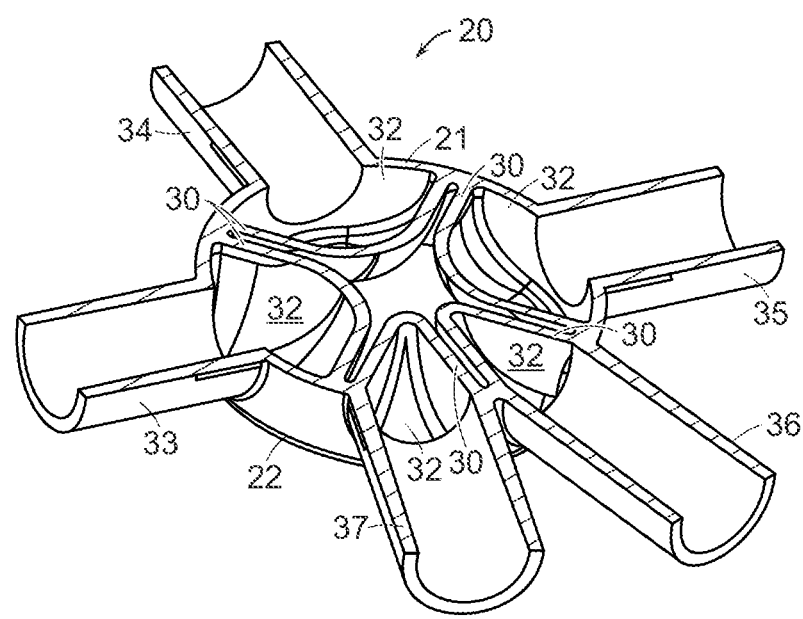
FIG. 8 is a cross-sectional view of the valve body as seen along line 8-8 of FIG. 2.
Figure 9:
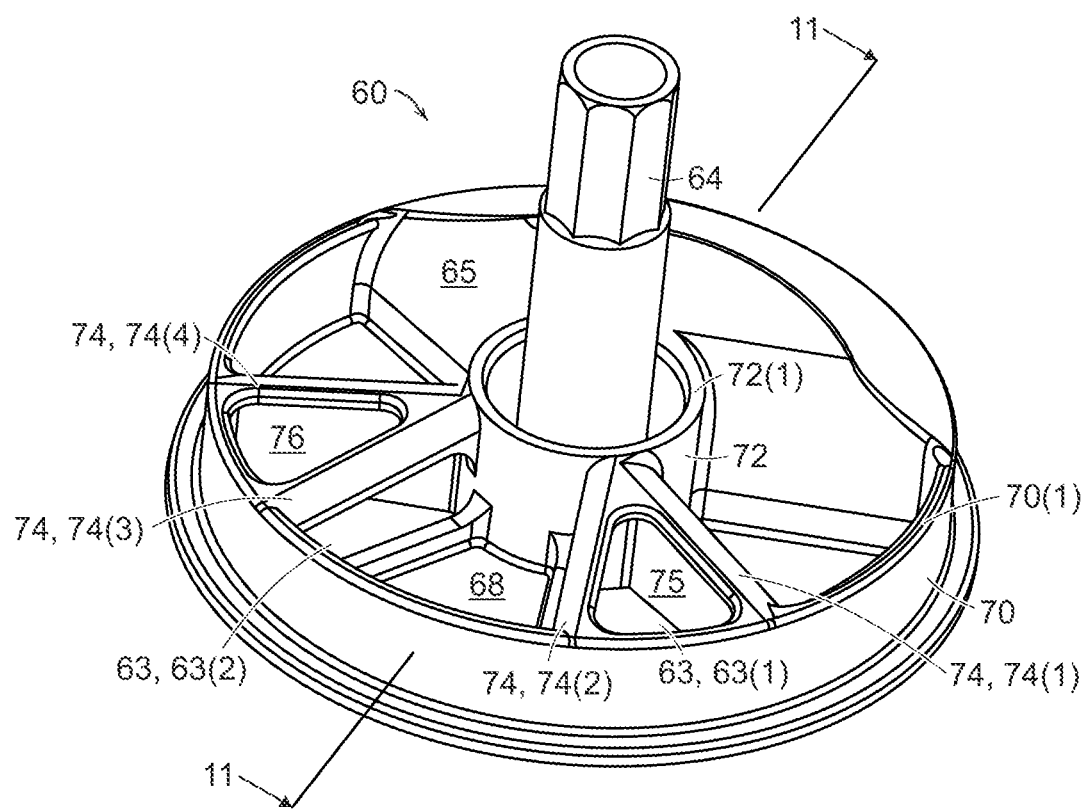
FIG. 9 is a top perspective view of the diverter.
Figure 17:
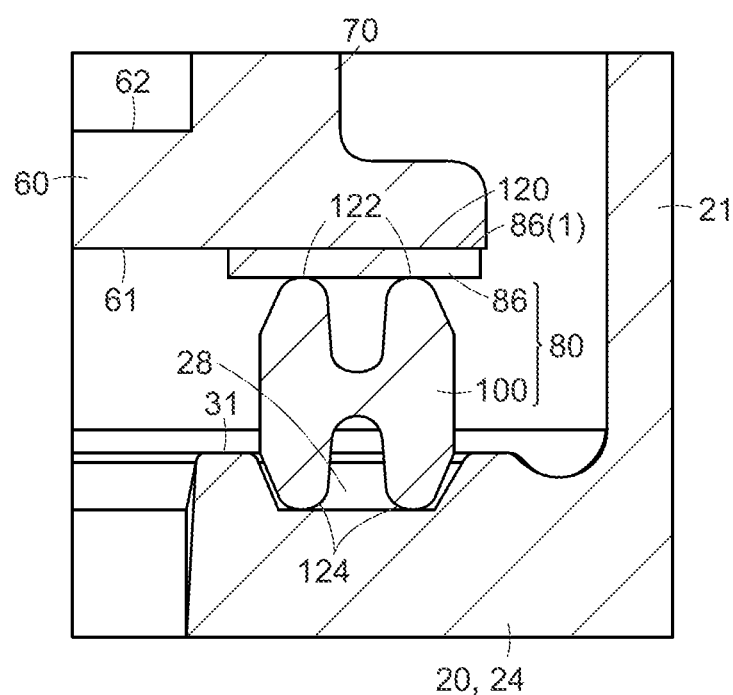
FIG. 17 is an enlargement of the portion of FIG. 4 indicated in broken lines.
Figure 18:
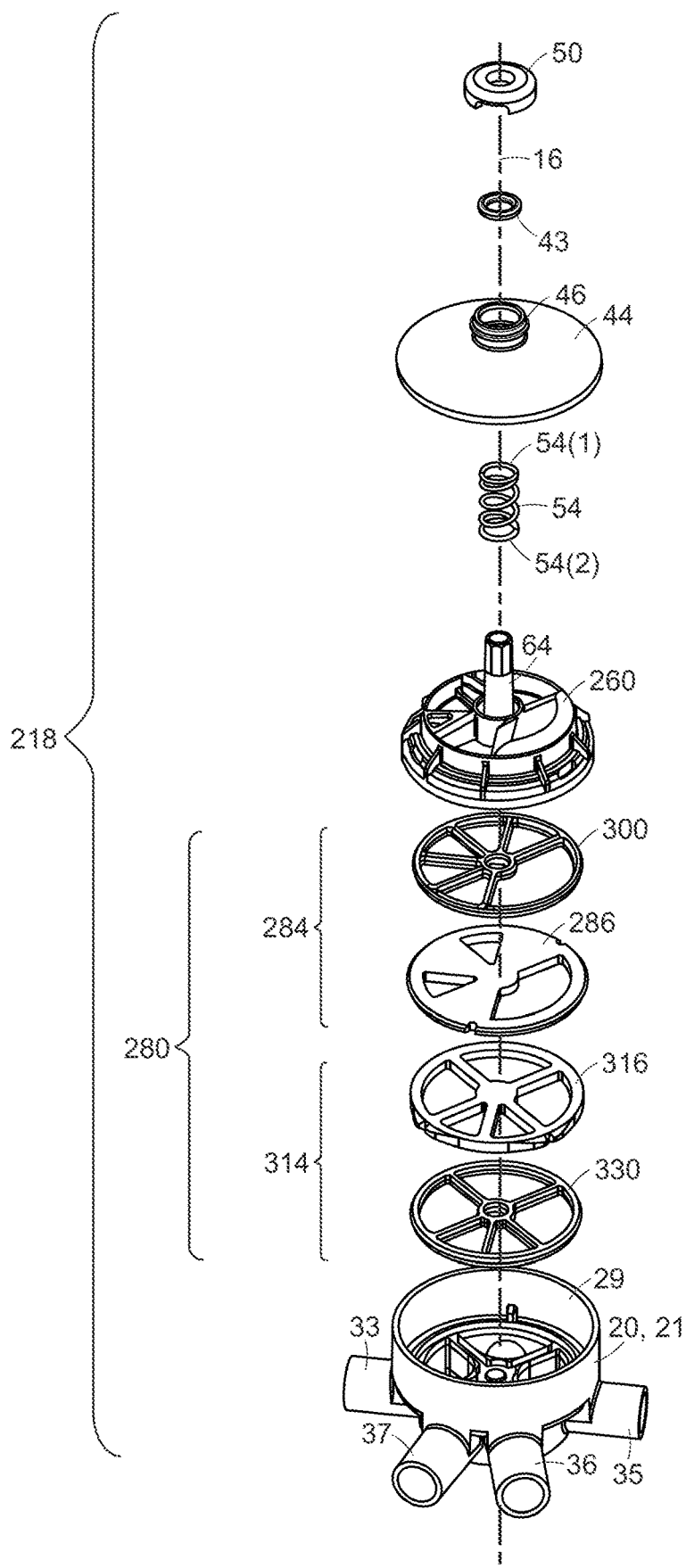
FIG. 18 is an exploded view of an alternative embodiment rotary disc valve.
Figure 19:
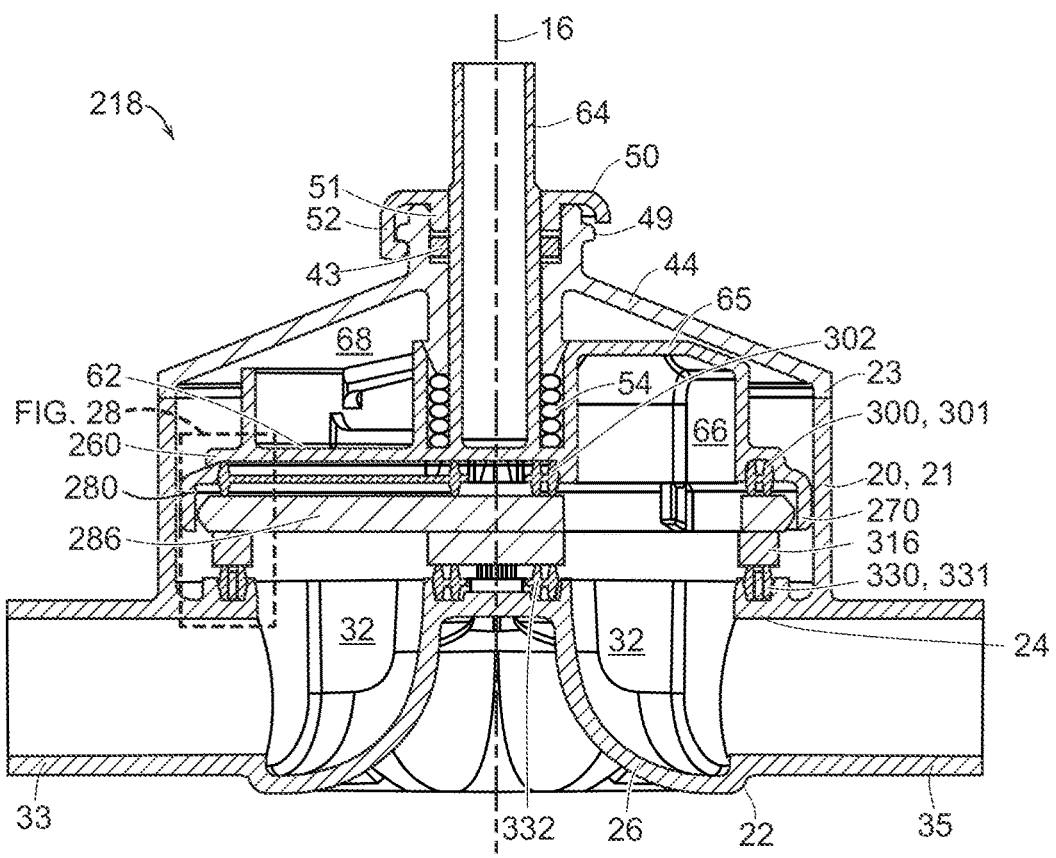
FIG. 19 is a cross-sectional view of the rotary disc valve of FIG. 18.
Figure 20:
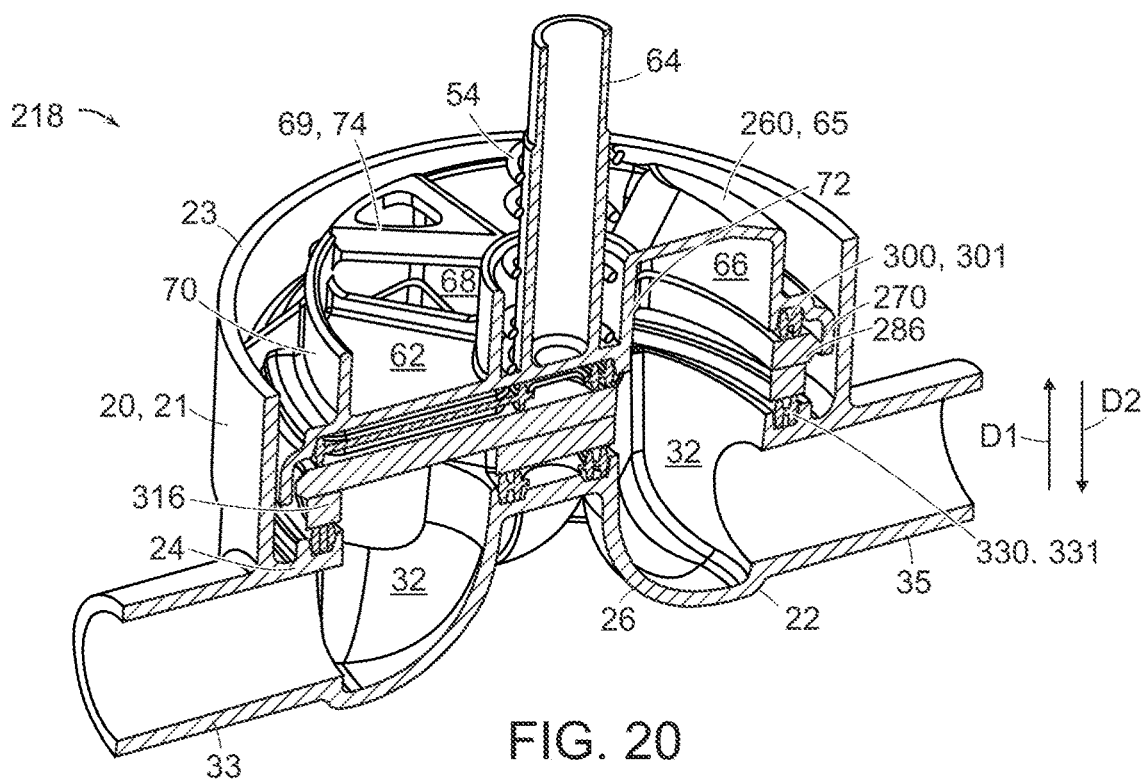
FIG. 20 is a cross-sectional view of the rotary disc valve of FIG. 18 with the lid, cap, and shaft seal omitted.
Figure 21:
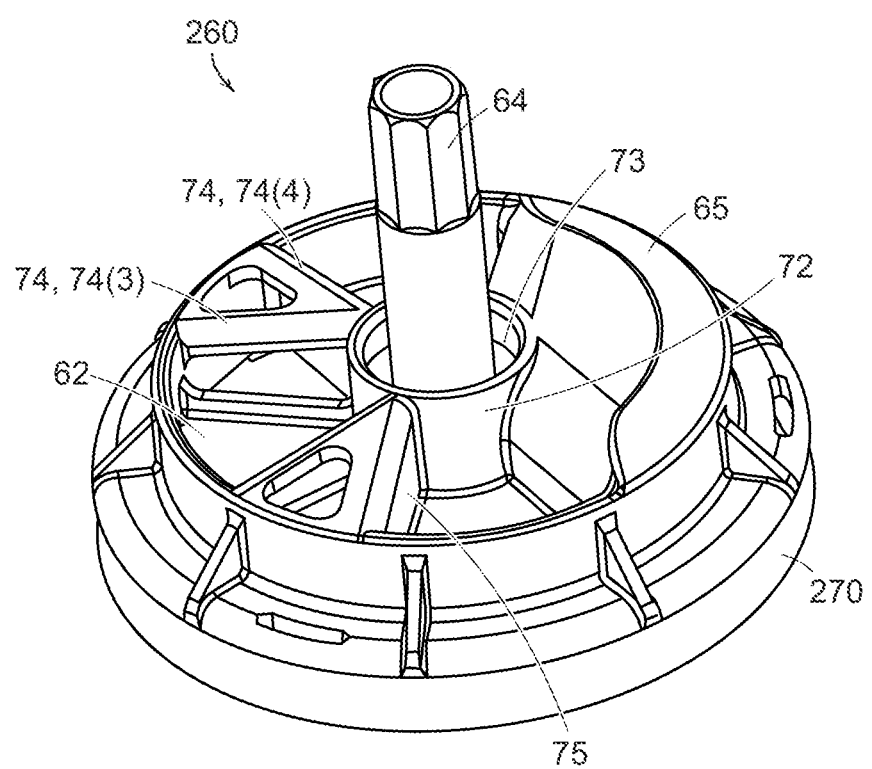
FIG. 21 is a top perspective view of the diverter of FIG. 18.
Figure 22:
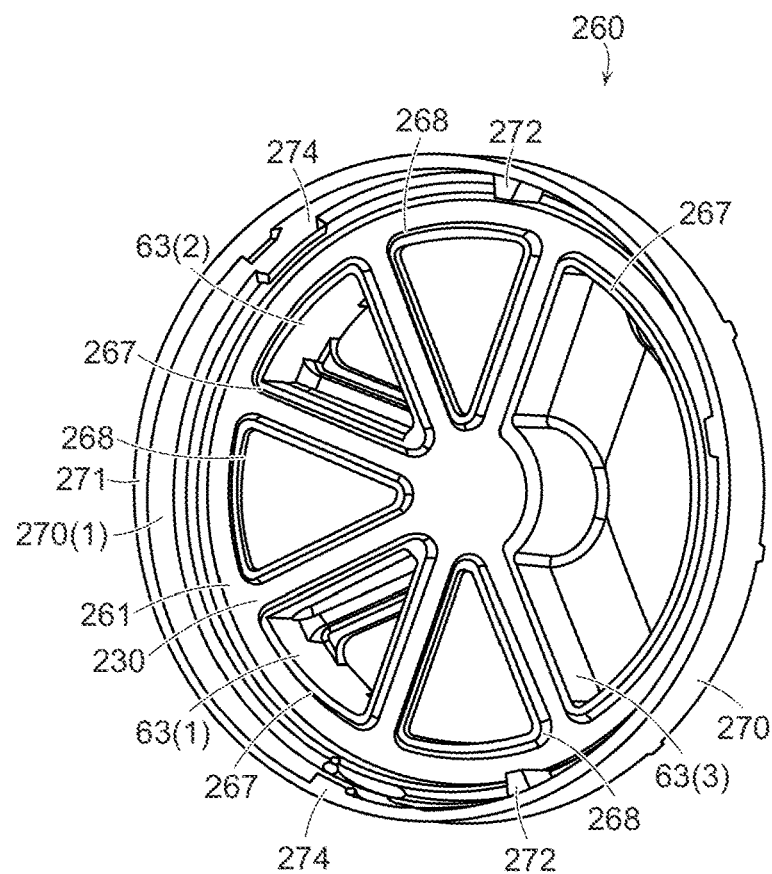
FIG. 22 is a bottom perspective view of the diverter of FIG. 18.
Figure 23:
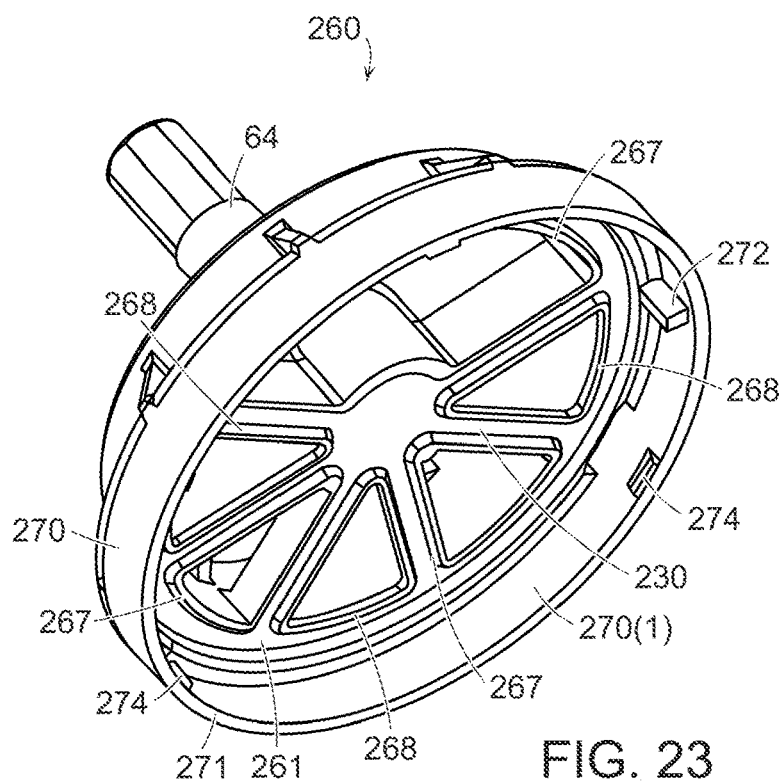
FIG. 23 is another bottom perspective view of the diverter of FIG. 18.
Figure 24:
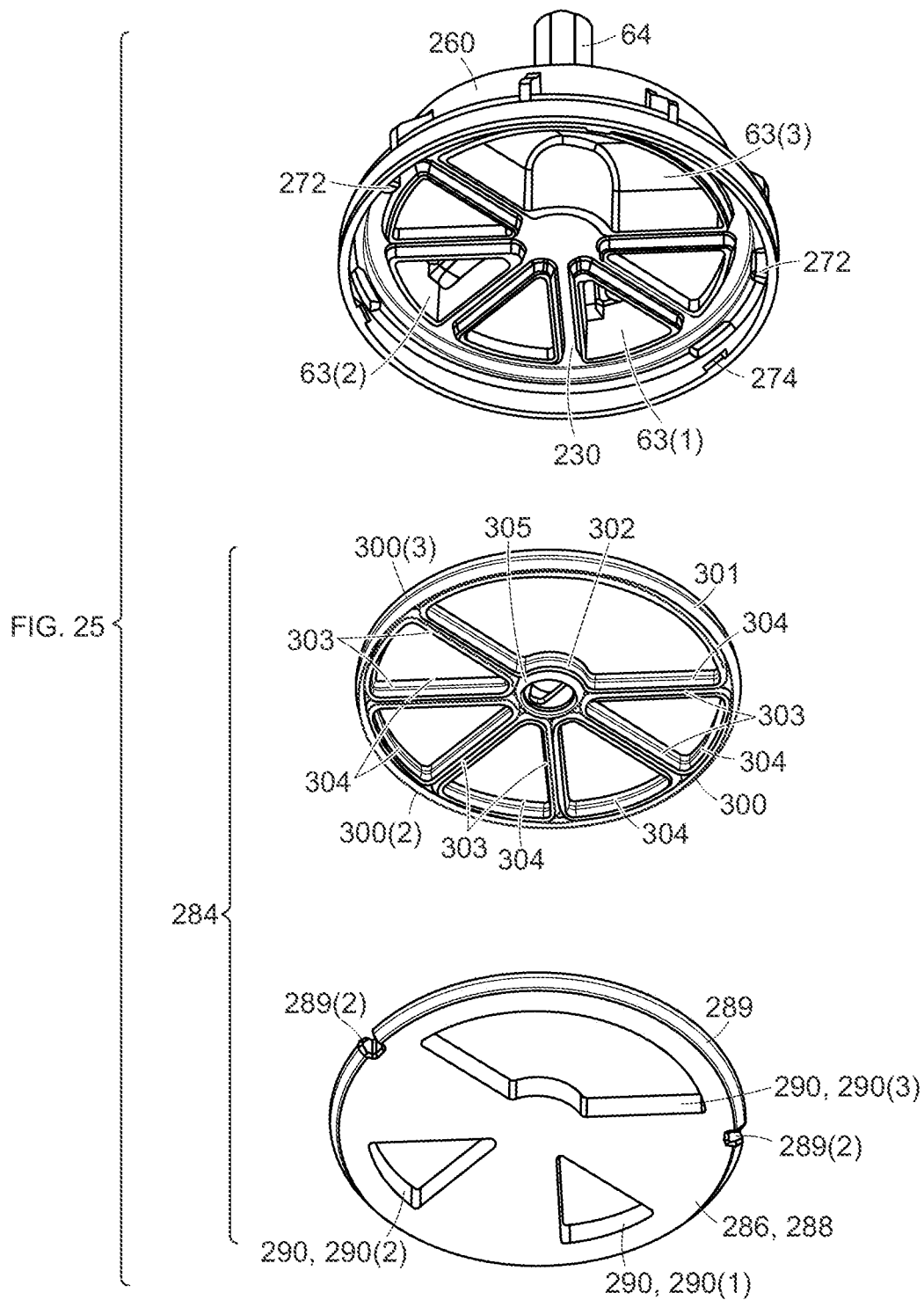
FIG. 24 is an exploded view of the diverter and first seal subassembly shown in FIG. 25.
Figure 25:
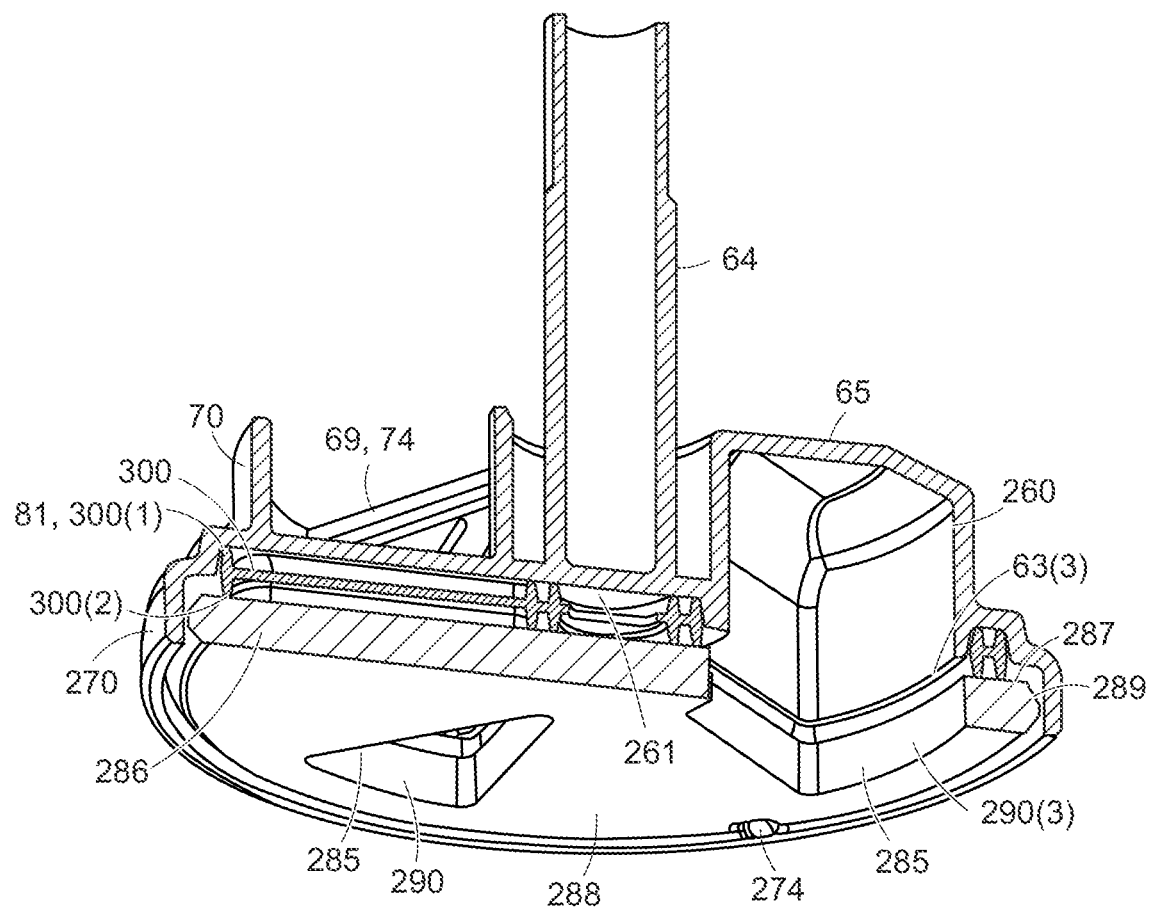
FIG. 25 is an assembled view of the diverter and first seal subassembly.
Figure 26:
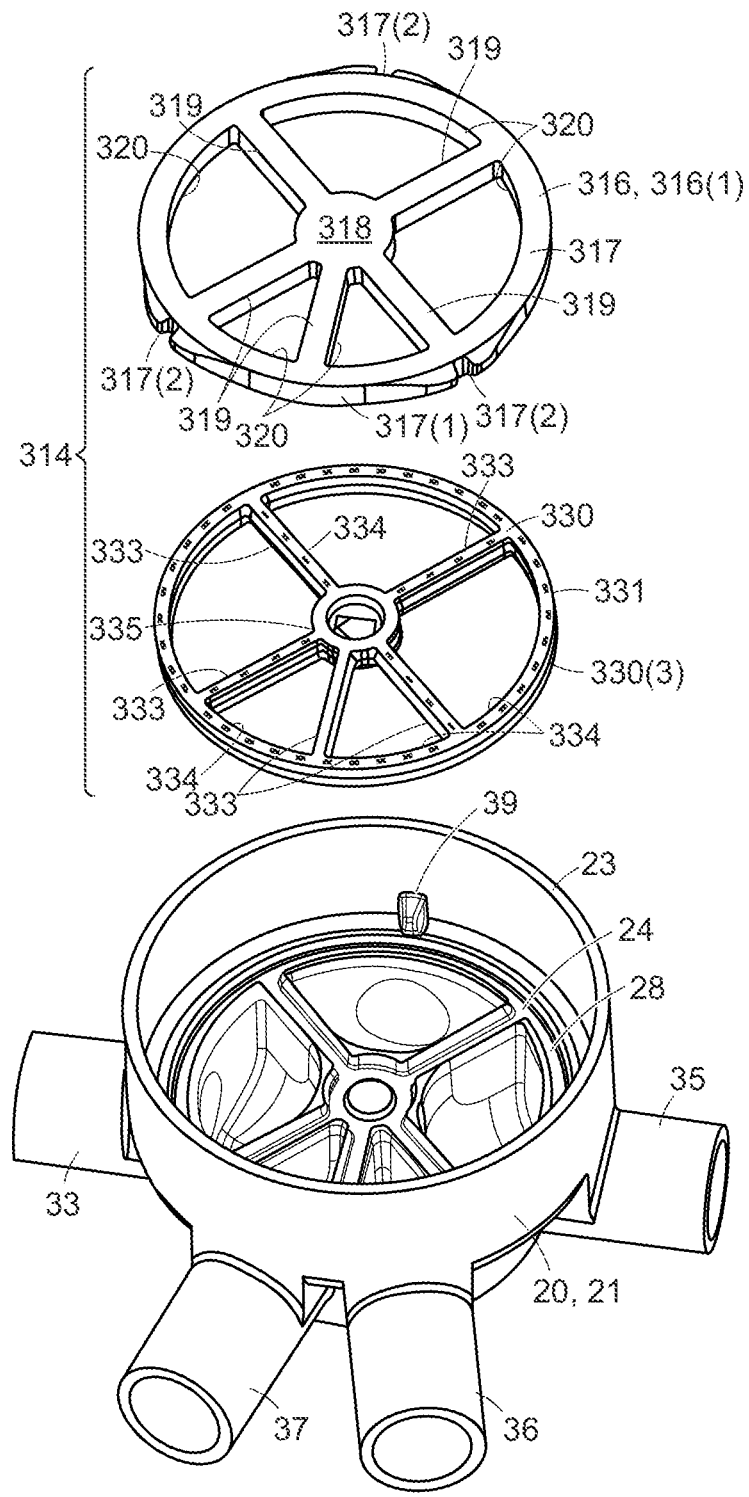
FIG. 26 is an exploded view of the valve body and second seal subassembly shown in FIG. 27.
Figure 27:
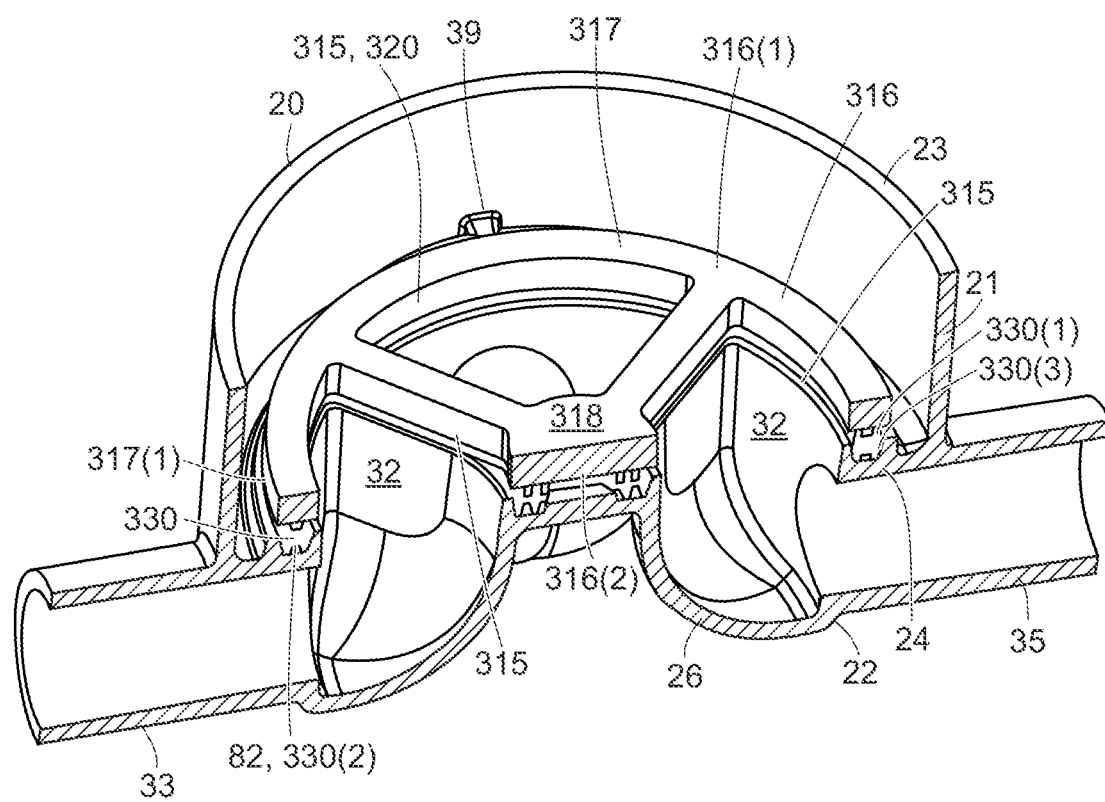
FIG. 27 is an assembled view of the valve body and the second seal subassembly.

Referring to FIGS. 3-4 and 17, the rotary disc valve 18 includes the spring 54 that is disposed between the lid 44 and the diverter 60. In the illustrated embodiment, the spring 54 is a coil spring that surrounds the valve shaft 64. One end 54(1) of the spring 54 abuts the end face 46(3) of the sleeve 46, and an opposed end 54(2) of the spring 54 is disposed in the groove 73 between the diverter inner rim 72 and the valve shaft 64. Within the assembly, the spring 54 is under compression, whereby the spring 54 biases the diverter 60 toward the valve body base 26 and provides a sealing force to the seal assembly 80. In particular, the spring 54 pushes the diverter 60 toward the valve body base 26 with the seal assembly 80 disposed therebetween to facilitate a fluid-tight seal within the rotary disc valve 18. The spring 54 effects a fluid-tight seal 120 between diverter sealing surface 61 and the diverter-facing surface 86(1) of the seal plate 86 during relative motion between the diverter 60 and the seal plate 86. This seal 120 between relatively moving parts is referred to as a "dynamic seal." In addition, the spring 54 cooperates with the relatively soft and resilient elastic element 100 to permit the seal assembly 80 to adapt to the changes in dimension caused by changes in temperature and due to wear of the diverter 60 and seal plate 86. Since the seal plate 86 is compressed against the elastic element 100 via the biasing force of the spring 54, a fluid-tight first static seal 122 exists between surfaces of the seal plate 86 and surfaces of the elastic element 100 having direct contact, and a fluid-tight second static seal 124 exists between surfaces of the elastic element 100 and surfaces of the valve body 20 having direct contact. The term "static seal" is used herein to refer to a seal between relatively fixed parts.

In the embodiment of the rotary disc valve 18 described above, the diverter 60 is disposed on a first side of the seal assembly 80 and the valve ports 33, 34, 35, 36, 37 are disposed on a second, opposed side of the seal assembly 80. In addition, the diverter 60 is configured to control fluid flow through the valve body 20 in such a way that fluid enters the diverter 60 in a first direction D1 (FIG. 11) that is parallel to the rotational axis 16. For example, fluid may enter a valve port 33, pass through a corresponding valve subchamber 32, pass through a corresponding seal through opening 83 and enter a corresponding diverter through opening 63. Within the diverter 60, fluid enters the diverter through opening 63 at the diverter sealing surface 61 and exits the diverter through opening at the diverter outer surface 62. Depending on the diverter through opening 63 and the rotational position of the diverter 60 relative to the valve body 20, the fluid may then pass through either the first (closed) fluid passageway 66 or the second (open) fluid passageway 68 to another diverter through opening 63. This diverter fluid opening 63 directs fluid toward another seal through opening 83 and its corresponding subchamber 32, whereby fluid exits the diverter 60 in a second direction D2 (FIG. 11) that is parallel to the rotational axis 16, the second direction being opposite the first direction. By this configuration, between entering and exiting the diverter 60, fluid flows over a portion of the diverter outer surface 62 via the first fluid passage 66 and/or the second fluid passage 68.

In the above described rotary disc valve 18, the diverter 60 and seal assembly 80 may be plastic components. In some operating conditions, for example where the fluid passing through the valve includes debris such as sand particles, it may be advantageous to form the dynamic seal using ceramic components to provide a fluid tight seal having increased durability. An alternative rotary disc valve 218 that includes a dynamic seal achieved using ceramic components will now be described.

Referring to FIGS. 18-28, the rotary disc valve 218 is similar to the rotary disc valve 18 described above with respect to FIGS. 1-17, and common reference numbers are used to identify common elements. For example, the rotary disc valve 218 is a type of directional control valve that may be used in the fluid delivery system 1 to control fluid flow and distribution through the system 1, and includes the valve body 20, lid 44 and the spring 54 as previously described. The rotary disc valve 218 of FIGS. 18-28 differs from the previous embodiment in that it includes a ceramic dynamic seal 220. To that end, the rotary disc valve 218 includes an alternative embodiment diverter 260 and an alternative embodiment seal assembly 280, each disposed in the valve body 20. The alternative embodiment diverter 260 and the alternative embodiment seal assembly 280 will now be described in detail.

The diverter 260 shown in FIGS. 18-25 is similar to the diverter 60 described above with respect to FIGS. 9-11 in that the diverter 260 is generally disc shaped, and includes a diverter sealing surface 261 that faces toward the base 26, and a diverter outer surface 62 that is opposed to the diverter sealing surface 261 and faces away from the base 26. The diverter sealing surface 261 faces a corresponding diverter-facing surface 287 of the seal assembly 280. Unlike the previous embodiment, although the diverter sealing surface 261 is generally planar, the diverter sealing surface 261 includes protruding ridges 267 that surround the diverter through openings 63(1), 63(2), 63(3). In addition, the diverter sealing surface 261 includes bosses 268 disposed between the diverter through openings 63(1). 63(2), 63(3). Each boss 268 has a circular sector-shaped profile when the diverter sealing surface 261 is viewed in a direction parallel to the rotational axis 16. The ridges 267 and bosses 268 together form a raised pattern that matches the profile of the facing element (e.g., the first elastic element 300) of the seal assembly 280. The ridges 267 and the bosses 268 cooperate to define a wide, shallow diverter channel 230 that receives and supports a portion of the first elastic element 300 of the seal assembly 280, as discussed further below. By this configuration, the first elastic element 300 is rotationally located with respect to, and prevented from relative rotation with respect to, the diverter 260.

The diverter 260 further differs from the diverter 60 of the previous embodiment in that the diverter 260 includes a skirt 270 that depends from an outer periphery of the diverter sealing surface 261.

The skirt 270 includes skirt ribs 272 that protrude inward from inner surface of the skirt 270. The skirt ribs 272 are spaced apart along an inner circumference of the skirt 270. The skirt ribs 272 extend axially, beginning at the diverter sealing surface 261, and terminating at a location that is spaced apart from the skirt open end 271. The skirt ribs 272 are configured to engage with a portion of the seal assembly 280, as discussed further below. In the illustrated embodiment, the skirt 270 includes two skirt ribs 272.

The skirt 270 includes ledges 274 disposed at a distal end 270(2) of the skirt 270 and that protrude inward from the inner surface 270(1) of the skirt 270. The ledges 274 are spaced apart along an inner circumference of the skirt 270, and are used to retain a first seal subassembly 284 of the seal assembly 280 within the space defined by the skirt 270. In the illustrated embodiment, the skirt 270 includes three ledges, a circumferential dimension of each ledge 274 is small relative to the dimension of the skirt inner circumference.

Referring to FIGS. 18-20 and 24-28, the seal assembly 280 is disposed in the valve chamber 29 between the diverter sealing surface 261 and the base 26 of the valve body 20, more particularly between the diverter sealing surface 261 and the platform 24. The seal assembly 280 differs from the seal assembly 80 described above with respect to FIGS. 3-4 and 14-17 in that the seal assembly 280 includes a first seal subassembly 284 and a second seal subassembly 314. The first seal subassembly 284 is disposed within the diverter 260 so as to be surrounded by the skirt 270, and is fixed relative to the diverter 260. The second seal subassembly 314 is disposed within the valve chamber 29 so as to reside in the platform channel 28, and is fixed relative to the valve body 20. The first and second seal subassemblies 284, 314 will now be described in detail.

The first seal subassembly 284 is an assembly of two sealing elements. In particular, the first seal subassembly 284 includes a first seal plate 286 that is disposed between the diverter sealing surface 261 and the second seal subassembly 314, and a first elastic element 300 that is disposed between the diverter sealing surface 261 and the first seal plate 286. The first sealing element 300 is stacked with the first seal plate 286 in a direction parallel to the rotational axis 16.

The first seal plate 286 is a rigid cylindrical plate and includes a first plate diverter-facing surface 287 that faces toward the diverter sealing surface 261, and a first plate base-facing surface 288 that faces toward the base 26. The first seal plate 286 includes a first plate peripheral surface 289 that extends between the first plate diverter-facing and base-facing surfaces 287, 288. The first plate diverter-facing and base-facing surfaces 287, 288 are planar (e.g., flat or level and smooth, without raised areas, protrusions, recesses, indentations or surface features or irregularities). The diverter-facing surface 287 also faces, and directly contacts, a corresponding facing surface 300(2) of the intervening first elastic element 300, as discussed in detail below.

The first seal plate 286 includes first plate through openings 290 having a circular sector-shaped profile when the first seal plate 286 is viewed in a direction parallel to the rotational axis 16. The first plate through openings 290 extend between the first plate diverter-facing and base-facing surfaces 287, 288. The first plate through openings 290 are spaced apart from each other. The first and second first plate through openings 290(1), 290(2) have a small arc length as compared to that of the third first plate through opening 290(3). For example, in the illustrated embodiment, the first and second first plate through openings 290(1), 290(2) have an arc length of in a range of 30 degrees to 60 degrees and the third first plate through opening 290(3) has an arc length in a range of 60 degrees to 120 degrees. In the illustrated embodiment, the first plate through openings 290(1). 290(2) and 290(3) are axially aligned with a corresponding one of the diverter through openings 63(1), 63(2), 63(3), and having the same shape and dimensions as that of the diverter through opening 63 with which it is aligned.

The first plate peripheral surface 289 faces the sidewall 21. Rectangular notches 289(2) are provided in the first plate peripheral surface 289. The notches 289(2) are spaced apart along the circumference of the first seal plate 286 and open facing the sidewall 21. The notches 289(2) are shaped and dimensioned to receive a corresponding one of the skirt ribs 272 that protrude inward from inner surface of the diverter skirt 270 in a clearance fit, for example a location fit. The skirt ribs 272 engage the notches 289(2), whereby the first seal plate 286 is prevented from rotating relative to the diverter 260. In the illustrated embodiment, the first peripheral surface 289 is circular when viewed in a direction parallel to the rotational axis 16, and includes two notches 289(2).

The first plate base-facing surface 288 provides one of the dynamic sealing surfaces of the seal assembly 280. In particular, first plate base-facing surface 288 faces toward, and directly contacts, a facing surface 316(1) of the second seal subassembly 314. Since the first seal plate 286 rotates in concert with the diverter 260 relative to the second seal subassembly 314 during valve use, the first seal plate 286 is formed of a highly wear resistive material. For example, in the illustrated embodiment, the first seal plate 286 may be ceramic or stainless steel.

The first seal plate 286 is a thin plate in that the axial dimension, or thickness, of the first seal plate 286 is less than the dimension of the first seal plate 286 in a direction perpendicular to the axial dimension (e.g., less than the diameter of the first seal plate 86). For example, in the illustrated embodiment, the diameter of the first seal plate 286 may be in a range of 10 times the first seal plate thickness to 20 times the first seal plate thickness. However, the first seal plate 286 is relatively thick as compared to the seal plate 86 described above with respect to FIGS. 3-4 and 14-17.

The first elastic element 300 is similar to the elastic element 100 described above with respect to FIGS. 3-4 and 14-17, except for the arrangement of first element struts 303. In particular, the first elastic element 300 includes a first element outer annular portion 301, a first element inner annular portion 302, and first element struts 303 that extend between the first element outer annular portion 301 and the first element inner annular portion 302, giving the first elastic element 300 the appearance of a spoked wheel when viewed in a direction parallel to the rotation axis 16. The first elastic element 300 has first element through openings 304, which are defined between the first element outer and inner annular portions 301, 302 and each pair of adjacent first element struts 303. By this configuration, the first element through openings 304 are each generally circular sector shaped. The first element struts 303 are not equidistantly spaced, whereby the respective first element through openings 304 do not each have the same arc length. Certain ones of the first element through openings 304 are aligned with corresponding first plate through openings 290, and each first element through opening 304 has the same shape and dimension as the first sealing element through opening 290 with which it is aligned. By this configuration, the first plate and first element through openings 290, 304 together provide first seal subassembly through openings 285.

Although in the illustrated embodiment the first element inner annular portion 302 has a polygonal central opening 305, in other embodiments the central opening 305 may be omitted.

The diverter-facing surface 300(1) of the first elastic element 300 faces toward, and directly contacts, the diverter sealing surface 261. More particularly, the first elastic element 300 is partially received in the diverter channel 230 which is shaped and dimensioned to receive the first elastic element diverter-facing surface 300(1) and peripheral edges 300(3) in a clearance fit, for example a sliding fit. The engagement between the elastic element peripheral edges 300(3) and surfaces of the diverter channel 230 serves to prevent relative rotation of the first elastic element 300 relative to the valve body 20. Thus, both the first elastic element 300 and the first seal plate 286 are fixed relative to the valve body 20.

The first elastic element 300 has a greater elasticity than the first seal plate 286. In addition, the first elastic element 300 is formed of an elastic material that is compatible with the fluid that flows through the rotary disc valve 18 and meets the requirements for operating temperature and durability. For example, when the rotary disc valve 218 is used to control fluid in a vehicle coolant system, the first elastic element 300 is formed of an elastomer that is compatible with automotive coolant, such as ethylene propylene diene monomer (EPDM).

In addition to material selection, the softness and resilience of the first elastic element 300 may be further increased and/or optimized by providing the first element outer and inner annular portions 301, 302 and the first element struts 303 with an irregular cross-sectional shape. For example, in some embodiments, the first element outer and inner annular portions 301, 302 and the first element struts 303 may include a non-circular and non-rectangular cross-sectional shape. In the illustrated embodiment, the first element outer annular portion 301, the first element inner annular portion 302, and the first element struts 303 of the first elastic element 300 have an H shaped cross-section.

The first elastic element 300 is thin in that the axial dimension, or thickness, of the first elastic element 300 is much less than the dimension of the first elastic element 300 in a direction perpendicular to the axial dimension (e.g., much less than the diameter of the first elastic element 300). For example, in the illustrated embodiment, the diameter of the first elastic element 300 may be in a range of 10 times the elastic element thickness to 20 times the elastic element thickness. However, the thickness of the first elastic element 300 is approximately equal to the thickness of the first seal plate 286. In addition, the diameter of the first elastic element 300 is slightly less than a diameter of the first seal plate 286.

The second seal subassembly 314 is an assembly of two sealing elements. In particular, the second seal subassembly 314 includes a second seal plate 316 that is disposed between the first seal subassembly 284 and the platform 24 of the valve body 20, and a second elastic element 330 that is disposed between the second seal plate 316 and the platform 24. The second seal plate 316 and the second elastic element 330 are stacked in a direction parallel to the rotational axis 16.

The second seal plate 316 includes a second plate outer annular portion 317, a second plate inner annular portion 318, and second plate struts 319 that extend between the second plate outer annular portion 317 and the second plate inner annular portion 318, giving the second seal plate 316 the appearance of a spoked wheel when viewed in a direction parallel to the rotation axis 16. The second seal plate 316 has second plate through openings 320, which are defined between the plate outer and inner annular portions 317, 318 and each pair of adjacent second plate struts 319. By this configuration, the second plate through openings 320 are each generally circular sector shaped. The second plate struts 319 are not equidistantly spaced, whereby the respective second plate through openings 320 do not each have the same arc length.

Although the second plate inner annular portion 318 is free of a central opening, a central opening may be included in some embodiments.

The second plate outer annular portion 317 has a second plate peripheral surface 317(1) that faces the sidewall 21. Rectangular notches 317(2) are provided in the second plate peripheral surface 317(1). The notches 317(2) are spaced apart along the circumference of the second plate outer annular portion 317 and open facing the sidewall 21. The notches 317(2) are shaped and dimensioned to receive the sidewall ribs 39 in a clearance fit, for example a location fit. The sidewall ribs 39 engage the notches 317(2), whereby the second seal plate 316 is prevented from rotating relative to the valve body 20. In the illustrated embodiment, the plate peripheral surface 317(1) is circular, except that it slightly protrudes radially outward in the vicinity of the notches 317(2).

The second plate diverter-facing and base-facing surfaces 316(1), 316(2) are planar (e.g., flat or level and smooth, without raised areas, protrusions, recesses, indentations or surface features or irregularities). The diverter-facing surface 316(1) of the second seal plate 316 provides a portion of the dynamic seal 220 of the seal assembly 280. In particular, the diverter-facing surface 316(1) faces toward, and directly contacts, the base-facing surface 288 of the first seal plate 286 of the first seal subassembly 284. Since the first seal subassembly 284 rotates along with the diverter 260 relative to the valve body 20 during valve use, second seal plate 316 is rigid, and is formed of a highly wear-resistive material. In some embodiments, for example, the second seal plate 316 may be ceramic or stainless steel.

The second seal plate 316 is a thin plate in that the axial dimension, or thickness, of the second seal plate 316 is much less than the dimension of the second seal plate 316 in a direction perpendicular to the axial dimension (e.g., much less than the diameter of the second seal plate 316). For example, in the illustrated embodiment, the diameter of the second seal plate 316 may be in a range of 10 times the second seal plate thickness to 20 times the second seal plate thickness. However, the second seal plate 316 is relatively thick as compared to the seal plate 86 described above with respect to FIGS. 3-4 and 14-17 and has approximately the same thickness as that of the first seal plate 286.

In the illustrated embodiment, the second elastic element 330 is identical to the elastic element 100 illustrated in FIGS. 3-4 and 14-17.

The second elastic element 330 includes an second element outer annular portion 331, an second element inner annular portion 332, and second element struts 333 that extend between the second element outer annular portion 331 and the second element inner annular portion 332, giving the second elastic element 330 the appearance of a spoked wheel when viewed in a direction parallel to the rotation axis 16. The second elastic element 330 has second element through openings 334, which are defined between the second element outer and inner annular portions 331, 332 and each pair of adjacent second element struts 333. By this configuration, the second element through openings 334 are each generally circular sector shaped. The second element struts 333 are not equidistantly spaced, whereby the respective second element through openings 334 do not each have the same arc length. The second element through openings 334 are aligned with corresponding ones of the second plate through openings 320, and each second element through opening 334 has the same shape and dimension as the second plate through opening 320 with which it is aligned. By this configuration, the second plate and second element through openings 320, 334 together provide second seal subassembly through openings 315.

In the illustrated embodiment, the second element inner annular portion 332 has a central opening 335. In other embodiments, the central opening 335 may be omitted.

The base-facing surface 330(2) of the second elastic element 330 provides the seal outer surface 82 of the seal assembly 280, and the base-facing surface 330(2) faces toward, and directly contacts, the platform 24. More particularly, the second elastic element 330 rests in the platform channel 28 which is shaped and dimensioned to receive the elastic element base-facing surface 330(2) and peripheral edges 330(3) in a clearance fit, for example a sliding fit. The engagement between the elastic element peripheral edges 330(3) and surfaces of the platform channel 28 serves to prevent relative rotation of the second elastic element 330 relative to the valve body 20. Thus, both the second elastic element 330 and the second seal plate 316 are fixed relative to the valve body 20.

The second elastic element 330 has a greater elasticity than second seal plate 316. In addition, the second elastic element 330 is formed of an elastic material that is compatible with the fluid that flows through the rotary disc valve 218 and meets the requirements for operating temperature and durability. For example, when the rotary disc valve 218 is used to control fluid in a vehicle coolant system, the second elastic element 330 is formed of an elastomer that is compatible with automotive coolant, such as such as ethylene propylene diene monomer (EPDM).

In addition to material selection, the softness and resilience of the second elastic element 330 may be further increased and/or optimized by providing the element outer and inner annular portions 331, 332 and the second element struts 333 with an irregular cross-sectional shape. For example, in some embodiments, the element outer and inner annular portions 331, 332 and the second element struts 333 may include a non-circular and non-rectangular cross-sectional shape. In the illustrated embodiment, the second element outer annular portion 331, the second element inner annular portion 332, and the second element struts 333 of the second elastic element 330 each have an H shaped cross-section.

The second elastic element 330 is thin in that the axial dimension, or thickness, of the second elastic element 330 is much less than the dimension of the second elastic element 330 in a direction perpendicular to the axial dimension (e.g., much less than the diameter of the second elastic element 330). For example, in the illustrated embodiment, the diameter of the second elastic element 330 may be in a range of 10 times the elastic element thickness to 20 times the elastic element thickness. However, the thickness of the second elastic element 330 is approximately the same as the thickness of the second seal plate 316, and the diameter of the second elastic element 330 is the same as a diameter of the second seal plate 316.

Figure 28:
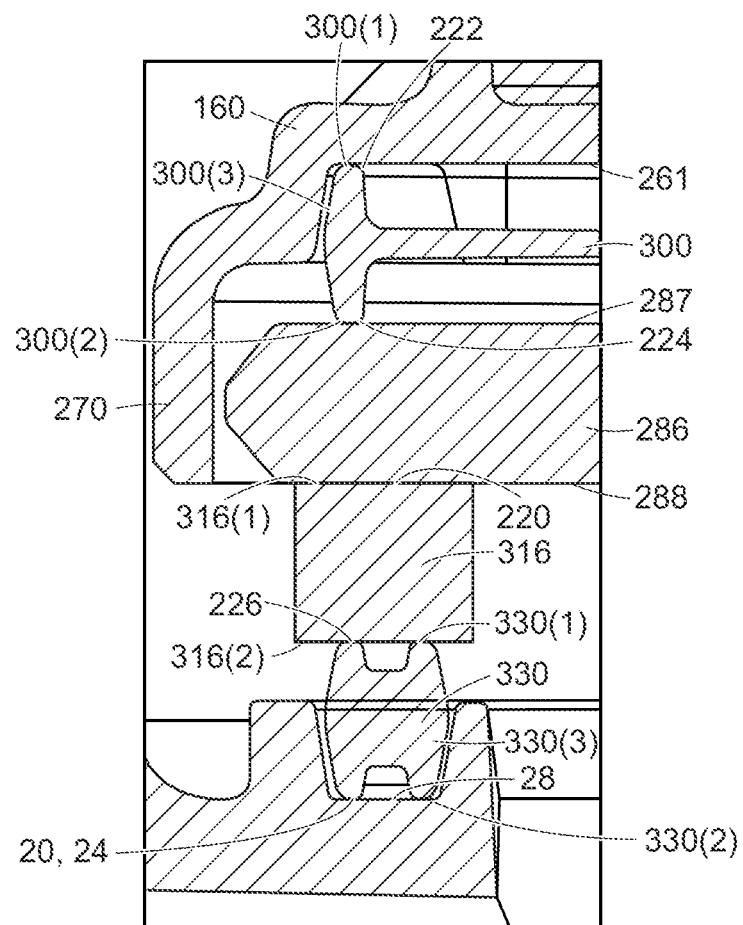
FIG. 28 is an enlargement of the portion of FIG. 19 indicated in broken lines.

Referring to FIG. 28, the rotary disc valve 218 includes the spring 54 that is disposed between the lid 44 and the diverter 260. Like the previous embodiment, the spring 54 is under compression, whereby the spring 54 biases the diverter 260 toward the valve body base 26 and provides a sealing force to the seal assembly 280. In particular, the spring 54 pushes the diverter 260 toward the valve body base 26 with the seal assembly 280 disposed therebetween to facilitate a fluid-tight seal within the rotary disc valve 218 that consists of several static seals and a dynamic seal. In the illustrated embodiment, a fluid-tight first static seal 222 is provided between the diverter sealing surface 261 and the diverter-facing surface 300(1) of the first elastic element 300. A fluid-tight second static seal 224 is provided between the base-facing surface 300(2) of the first elastic element 300 and the diverter-facing surface 287 of the first seal plate 286. A fluid-tight dynamic seal 220 is provided between the base-facing surface 288 of the first seal plate 286 and the diverter-facing surface 316(1) of the second seal plate 316. A fluid tight third static seal 226 is provided between the base-facing surface 316(2) of the second seal plate 316 and the diverter-facing surface 330(1) of the second elastic element 330. In addition, a fluid-tight fourth static seal 228 is provided between the base-facing surface 330(2) of the second elastic element 330 and the platform channel 28.

The first seal subassembly 284 is surrounded by the diverter skirt 270, and has first seal subassembly through openings 285 that are aligned with the diverter through openings 63. The second seal subassembly 314 is disposed within the valve body 20 so as to rest on the platform 24, and has second seal subassembly through openings 315 that are aligned with a corresponding subchamber 32 of the valve body 20. In certain rotational positions of the diverter 260 relative to the valve body 20, a subset of the first and second seal subassembly through openings 285, 315 are aligned with each other.

While the first seal subassembly 284 prevents fluid flow between the seal assembly 280 and the diverter 260 and the second seal subassembly 314 prevents fluid flow between the seal assembly 280 and the valve body 20, the dynamic seal 220 is provided between abutting portions of the first and second seal subassemblies 284, 314. The dynamic seal 220 prevents fluid flow between contacting surfaces of the first and second seal subassemblies 284, 314, and retains fluid within the through openings of the seal assembly 280, where the through openings of the seal assembly 280 are constituted by aligned through openings 285, 315 of the respective first and second subassemblies 284, 314.

In the rotary disc valve 218, the diverter 260 is disposed on a first side of the seal assembly 280 and the valve ports 33, 34, 35, 36, 37 are disposed on a second, opposed side of the seal assembly 280. In addition, the diverter 260 is configured to control fluid flow through the valve body 20 in such a way that fluid enters the diverter 260 in a first direction D1 that is parallel to the rotational axis 16. For example, fluid may enter a valve port 33, pass through a corresponding valve subchamber 32, pass through a corresponding seal through opening 285, 315 and enter a corresponding diverter through opening 63. Within the diverter 260, fluid enters the diverter through opening 63 at the diverter sealing surface 261 and exits the diverter through opening 63 at the diverter outer surface 62. Depending on the diverter through opening 63 and the rotational position of the diverter 260 relative to the valve body 20, the fluid may then pass through either the first (closed) fluid passageway 66 or the second (open) fluid passageway 68 to another diverter through opening 63. The diverter fluid opening 63 directs fluid toward another seal through opening 285, 315 and its corresponding subchamber 32, whereby fluid exits the diverter 60 in a second direction D2 that is parallel to the rotational axis 16, the second direction D2 being opposite the first direction D1. By this configuration, between entering and exiting the diverter 60, fluid flows over a portion of the diverter outer surface 62 via the first fluid passage 66 and/or the second fluid passage 68.

In the illustrated embodiments, a lid 44 is provided that closes the open end of the valve body 20. However, in other embodiments (not shown), the lid 44 may be omitted and the open end of the valve body 20 may be closed by a housing of the valve actuator or other ancillary structure.

The rotary disc valve 18 described in FIGS. 1-17 is exemplified by a dynamic seal 120 in which the components of the dynamic seal (e.g., the diverter 60 and the seal plate 86) are plastic, whereas the rotary disc valve 218 described in FIGS. 18-28 is exemplified by a dynamic seal 220 in which the components of the dynamic seal (e.g., the first and second seal plates 286, 316) are ceramic. However, it is understood that the components of the dynamic seal are not limited to the materials described. For example, in some embodiments, the components of the dynamic seal 120 of FIGS. 1-17 may be ceramic or other appropriate wear-resistant material, while the components of the dynamic seal 220 of FIGS. 18-28 may be plastic or other appropriate wear-resistant material.

Figure 29:
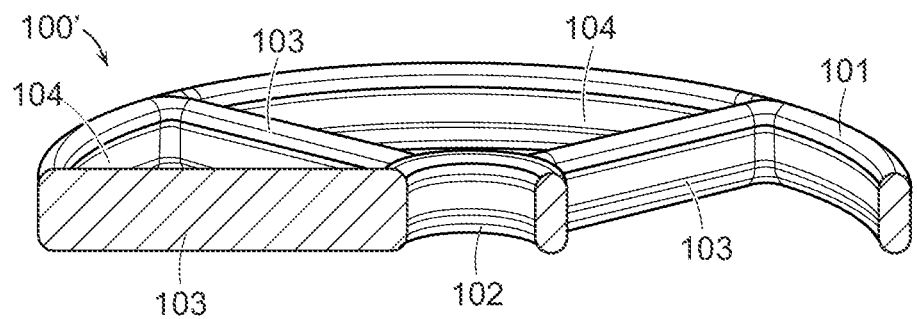
FIG. 29 is a cross-sectional view of an alternative embodiment elastic element.
Figure 30:
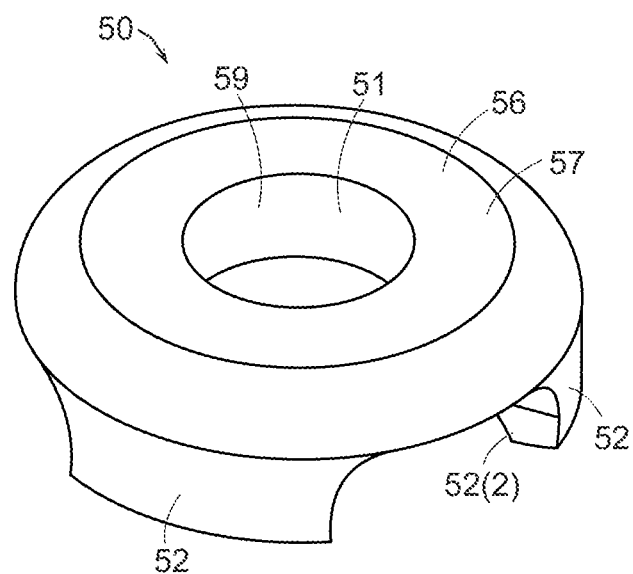
FIG. 30 is a first perspective view of a retaining cap.
Figure 31:
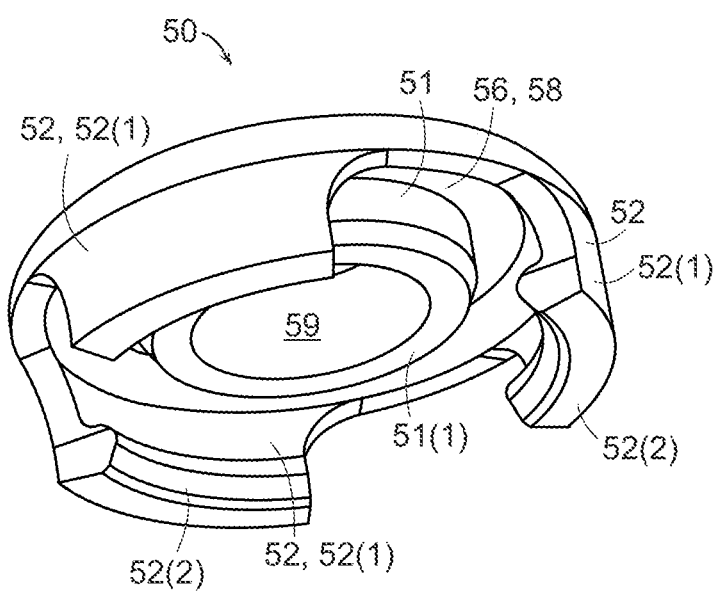
FIG. 31 is a second perspective view of the retaining cap of FIG. 30.
Figure 32:
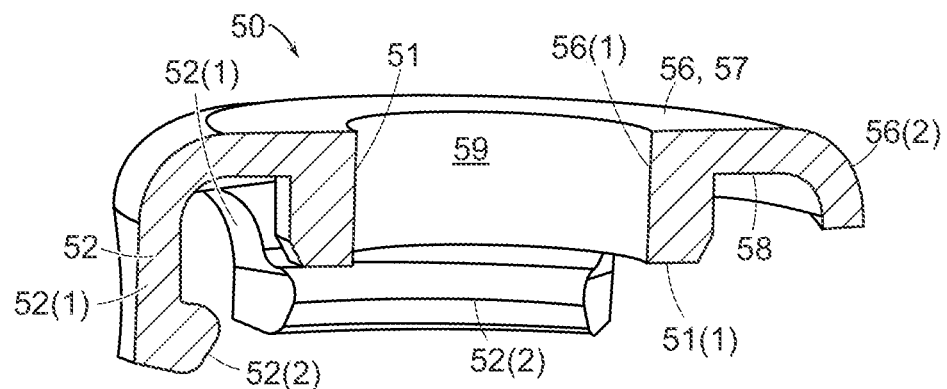
FIG. 32 is a cross-sectional view of the retaining cap of FIG. 30.

In the exemplary seal assemblies 80, 280 described above, the elastic elements 100, 300, 330 have been described as having an H-shaped cross-section. However, it is understood that other cross-sectional shapes may be employed to optimize the material properties of the elastic element 100, 300, 330 for a given application. For example, in some embodiments, an alternative elastic element 100' may be formed with the surface grooves 100(4). 100(5) omitted, whereby the elastic element 100' may have an oval (shown in FIG. 29), circular, rectangular or other polygonal cross-sectional shape. In other embodiments, the elastic element 100, 300, 330 may have an irregular cross-sectional shape such as an I-shape, X-shape, etcetera.

Figure 33:
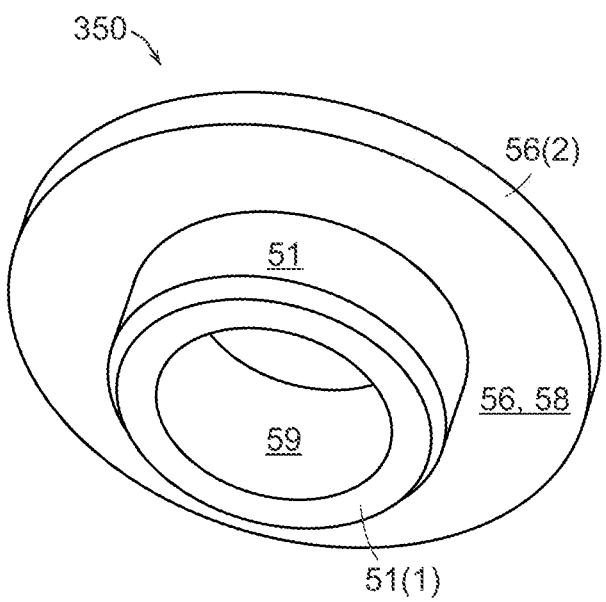
FIG. 33 is a perspective view of an alternative embodiment retaining cap.
Figure 34:
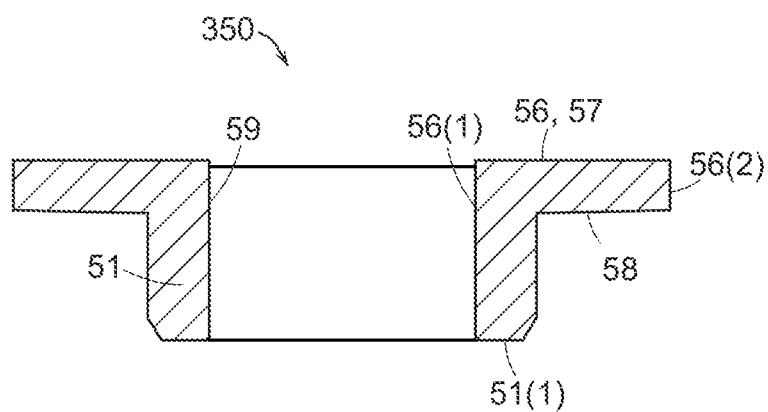
FIG. 34 is a cross-sectional view of the retaining cap of FIG. 33.

Although the rotary disk valve 18, 218 is described herein as including the retaining cap 50 that retains the shaft seal 43 on the valve shaft, the rotary disc valve 18 is not limited to the retaining cap 50 illustrated in FIGS. 2-4 and 30-32. For example, in other embodiments, an alternative retaining cap 350 may be used. Referring to FIGS. 33-34, the alternative retaining cap 350 is similar to the retaining cap 50 described above, and common reference numbers are used to refer to common elements. The retaining cap 350 of FIGS. 33-34 includes the end plate 56 and the collar 51. However, the retaining cap 350 of FIGS. 33-34 is formed without the latches 52, and engages the lid 44 via an interference fit between an outer surface of the collar 51 and an inner surface of the sleeve large diameter portion 46(1). In a manner identical to the previously described retaining cap 50, the retaining cap 350 of FIGS. 33-34 is retained on the lid 44 with the shaft seal 43 trapped between the end face 51(1) of the collar 51 and the shoulder 48. By this configuration, the shaft seal 43 is retained on the valve shaft 64.

Although the valve body 20 is described herein as including a post 25 that facilitates proper orientation of the seal assembly 80 with respect to the valve body 20, the post may be omitted in some embodiments, as shown in FIGS. 18-20 and 26-27.

Selective illustrative embodiments of the fluid delivery system including the rotary disc valve are described above in some detail. It should be understood that only structures considered necessary for clarifying the fluid delivery system and the rotary disc valve have been described herein. Other conventional structures, and those of ancillary and auxiliary components of the fluid delivery system and the rotary disc valve, are assumed to be known and understood by those skilled in the art. Moreover, while a working example of the fluid delivery system and the rotary disc valve have been described above, the fluid delivery system and the rotary disc valve are not limited to the working example described above, but various design alterations may be carried out without departing from the fluid delivery system and/or the rotary disc valve as set forth in the claims.

I claim:

1. A valve comprising:
    a valve body including
        a sidewall, and
        a base that closes one end of the sidewall, the sidewall and the base cooperating to define a chamber, and
        valve ports, each valve port communicating with the chamber;
    a diverter disposed in the chamber, the diverter configured to control fluid flow through the valve body, the diverter including
        a diverter sealing surface that faces toward the base,
        a diverter outer surface that is opposed to the diverter sealing surface and faces away from the base,
        diverter through openings that extend between the diverter sealing surface and the diverter outer surface, and
        a shaft that protrudes from the diverter outer surface in a direction perpendicular to the diverter sealing surface, the shaft configured to be driven to rotate about a rotational axis; and
    a seal assembly disposed in the chamber between the diverter sealing surface and the base, the seal assembly including
        a seal sealing surface that faces toward the diverter sealing surface,
        a seal outer surface that is opposed to the seal sealing surface and faces toward the base,
        seal through openings that extend between the seal sealing surface and the seal outer surface,
        a first sealing element disposed between the diverter and the base, the first sealing element including the seal sealing surface and being a first material; and
        a second sealing element disposed between the first sealing element and the base, the second sealing element including the seal outer surface and being a second material, the second material having greater elasticity than the first material,
    wherein
        the seal assembly is fixed relative to the base and prevents fluid flow between the diverter and the valve body and between abutting portions of the diverter sealing surface and the seal sealing surface,
        the diverter is configured to control fluid flow through the valve body in such a way that
            a) fluid enters the diverter via at least one diverter through opening in a first direction that is parallel to the rotational axis, and
            b) fluid exits the diverter via at least one diverter through opening in a second direction that is parallel to the rotational axis, the second direction being opposite the first direction.

2. The valve of claim 1, wherein the diverter is configured to control fluid flow through the valve body in such a way that, between entering and exiting, fluid flows over a portion of the diverter outer surface.

3. The valve of claim 1, wherein
    the diverter includes a fluid passageway that protrudes from the diverter outer surface, and
    for some rotational positions of the diverter relative to the valve body, the fluid passageway provides an enclosed fluid path between a first one of the valve ports and a second one of the valve ports.

4. The valve of claim 1, wherein the first sealing element is stacked with the second sealing element in a direction parallel to the rotational axis.

5. The valve of claim 4, wherein portions of the second sealing element have an oval cross-sectional shape.

6. The valve of claim 4, wherein
    each of the first sealing element and the second sealing element include
        an outer annular portion,
        an inner annular portion, and
        struts that extend between the outer annular portion and the inner annular portion.

7. The valve of claim 6, wherein
    a surface of the outer annular portion of the second sealing element includes a groove.

8. The valve of claim 6, wherein the outer annular portion, the inner annular portion and the struts each have an H-shaped cross-section.

9. The valve of claim 1, wherein
    the first sealing element is disposed between the diverter and the base; and
    the second sealing element is disposed between the first sealing element and the base, and
    an axial dimension of the second sealing element is in a range of 3 to 15 times an axial dimension of the first sealing element, where the term "axial" refers to a direction that is parallel to the rotational axis.

10. The valve of claim 1, wherein
    the first sealing element is disposed between the diverter and the base; and
    the second sealing element is disposed between the first sealing element and the base, and
    an outer radial dimension of the second sealing element is less than an outer radial dimension of the first sealing element.

11. The valve of claim 1, the valve comprising:
    a lid that closes an open end of the sidewall; and
    a spring disposed between the lid and the diverter, the spring biasing the diverter toward the base.

12. The valve of claim 1, wherein the diverter is disposed on a first side of the seal assembly and the valve ports are disposed on a second side of the seal assembly, and the first side of the seal assembly is opposite the second side of the seal assembly.

13. The valve of claim 1, wherein
the first sealing element is disposed between the diverter and the base,
the second sealing element is disposed between the first sealing element and the base, and
the valve comprises:
a first static seal formed between the first sealing element and the second sealing element,
a second static seal formed between the second sealing element and the base, and
a dynamic seal formed between the first sealing element and the diverter.

14. The valve of claim 13, wherein the diverter sealing surface is a planar surface that confronts and directly contacts under axial load a planar surface of the first sealing element, thereby realizing the dynamic seal.

15. A valve comprising:
a valve body including
a sidewall, and
a base that closes one end of the sidewall, the sidewall and the base cooperating to define a chamber, and
valve ports, each valve port communicating with the chamber;
a diverter disposed in the chamber, the diverter configured to control fluid flow through the valve body, the diverter including
a diverter sealing surface that faces toward the base,
a diverter outer surface that is opposed to the diverter sealing surface and faces away from the base,
diverter through openings that extend between the diverter sealing surface and the diverter outer surface, and
a shaft that protrudes from the diverter outer surface in a direction perpendicular to the diverter sealing surface, the shaft configured to be driven to rotate about a rotational axis; and
a seal assembly disposed in the chamber between the diverter sealing surface and the base, the seal assembly comprising:
a seal sealing surface that faces toward the diverter sealing surface,
a seal outer surface that is opposed to the seal sealing surface and faces toward the base
seal through openings that extend between the seal sealing surface and the seal outer surface,
a first sealing element disposed between the diverter and the base, the first sealing element including the seal sealing surface; and
a second sealing element disposed between the first sealing element and the base, the second sealing element including the seal outer surface,
wherein
the seal assembly is fixed relative to the base and prevents fluid flow between the diverter and the valve body and between abutting portions of the diverter sealing surface and the seal sealing surface,
the diverter is configured to control fluid flow through the valve body in such a way that
a) fluid enters the diverter via at least one diverter through opening in a first direction that is parallel to the rotational axis, and
b) fluid exits the diverter via at least one diverter through opening in a second direction that is parallel to the rotational axis, the second direction being opposite the first direction,
the first sealing element is prevented from rotating relative to the valve body via interlocking engagement between a first surface feature disposed on a periphery of the first sealing element and a second surface feature disposed on an inner surface of the sidewall, and
the second sealing element is disposed in a groove provided in a diverter-facing surface of the base, and the second sealing element is prevented from rotating relative to the valve body via engagement between the seal outer surface and an inner surface of the groove.

16. The valve of claim 15, wherein the second sealing element includes the seal outer surface and being a second material, the second material having greater elasticity than the first material.

17. A valve comprising:
a valve body including
a sidewall, and
a base that closes one end of the sidewall, the sidewall and the base cooperating to define a chamber, and
valve ports, each valve port communicating with the chamber;
a diverter disposed in the chamber, the diverter configured to control fluid flow through the valve body, the diverter including
a diverter sealing surface that faces toward the base,
a diverter outer surface that is opposed to the diverter sealing surface and faces away from the base,
diverter through openings that extend between the diverter sealing surface and the diverter outer surface, and
a shaft that protrudes from the diverter outer surface in a direction perpendicular to the diverter sealing surface, the shaft configured to be driven to rotate about a rotational axis; and
a seal assembly disposed in the chamber between the diverter sealing surface and the base, the seal assembly including
a seal sealing surface that faces toward the diverter sealing surface,
a seal outer surface that is opposed to the seal sealing surface and faces toward the base, and
seal through openings that extend between the seal sealing surface and the seal outer surface,
wherein
the seal assembly is fixed relative to the base and prevents fluid flow between the diverter and the valve body and between abutting portions of the diverter sealing surface and the seal sealing surface,
the diverter is configured to control fluid flow through the valve body in such a way that
a) fluid enters the diverter via at least one diverter through opening in a first direction that is parallel to the rotational axis, and
b) fluid exits the diverter via at least one diverter through opening in a second direction that is parallel to the rotational axis, the second direction being opposite the first direction,
the seal assembly comprises a first sealing element stacked with a second sealing element in a direction parallel to the rotational axis,
the first sealing element has first sealing element through openings,
the second sealing element has second sealing element through openings, and the first sealing element through openings have the same shape and dimension as the second sealing element through openings and are axially aligned with the second sealing element through openings.

18. The valve of claim 17, wherein the first sealing element through openings and the second sealing element through openings have the shape of a circular sector.

\* \* \* \* \*